(12) United States Patent
Di Profio et al.

(10) Patent No.: US 8,983,846 B2
(45) Date of Patent: Mar. 17, 2015

(54) INFORMATION PROCESSING APPARATUS, INFORMATION PROCESSING METHOD, AND PROGRAM FOR PROVIDING FEEDBACK ON A USER REQUEST

(75) Inventors: Ugo Di Profio, Kanagawa (JP); Akane Sano, Tokyo (JP); Kouichi Matsuda, Tokyo (JP); Tsutomu Sawada, Tokyo (JP); Keiichi Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 381 days.

(21) Appl. No.: 13/069,237

(22) Filed: Mar. 22, 2011

(65) Prior Publication Data

US 2011/0282673 A1 Nov. 17, 2011

(30) Foreign Application Priority Data

Mar. 29, 2010 (JP) ................................ P2010-074158

(51) Int. Cl.
| | | |
|---|---|---|
| G10L 15/00 | (2013.01) | |
| G10L 25/00 | (2013.01) | |
| G10L 15/22 | (2006.01) | |
| G06F 3/01 | (2006.01) | |
| H04N 5/44 | (2011.01) | |
| H04N 21/422 | (2011.01) | |
| H04N 21/4223 | (2011.01) | |
| H04N 21/44 | (2011.01) | |
| H04N 21/81 | (2011.01) | |

(52) U.S. Cl.
CPC ............... *G10L 15/22* (2013.01); *G06F 3/017* (2013.01); *H04N 5/4403* (2013.01); *H04N 21/42203* (2013.01); *H04N 21/4223* (2013.01); *H04N 21/44008* (2013.01); *H04N 21/8146* (2013.01)

USPC .................. 704/275; 704/270; 704/270.1

(58) Field of Classification Search
CPC ......... G10L 15/26; G10L 15/25; G10L 15/22; G06Q 30/016; G06N 3/006
USPC ................................................. 704/270–275
See application file for complete search history.

(56) References Cited

U.S. PATENT DOCUMENTS

| | | | | |
|---|---|---|---|---|
| 6,229,533 | B1 * | 5/2001 | Farmer et al. .................. | 345/473 |
| 6,233,561 | B1 * | 5/2001 | Junqua et al. ................. | 704/277 |
| 6,882,973 | B1 * | 4/2005 | Pickering ...................... | 704/270 |
| 6,988,072 | B2 | 1/2006 | Horvitz | |
| 7,669,134 | B1 * | 2/2010 | Christie et al. ................ | 715/758 |
| 2002/0135618 | A1 * | 9/2002 | Maes et al. .................... | 345/767 |
| 2002/0178007 | A1 * | 11/2002 | Slotznick et al. .......... | 704/270.1 |
| 2003/0018531 | A1 * | 1/2003 | Mahaffy et al. ................. | 705/16 |
| 2003/0088409 | A1 * | 5/2003 | Harris .......................... | 704/231 |
| 2003/0103090 | A1 * | 6/2003 | Kelley et al. .................. | 345/854 |
| 2004/0129478 | A1 * | 7/2004 | Breed et al. .................... | 180/273 |
| 2004/0172256 | A1 * | 9/2004 | Yokoi et al. .................... | 704/275 |
| 2004/0215460 | A1 * | 10/2004 | Cosatto et al. ................ | 704/260 |
| 2005/0144187 | A1 * | 6/2005 | Che et al. ...................... | 707/101 |
| 2007/0055520 | A1 * | 3/2007 | Mowatt et al. ................ | 704/251 |

(Continued)

*Primary Examiner* — Eric Yen
(74) *Attorney, Agent, or Firm* — Sherr & Jiang, PLLC

(57) ABSTRACT

Provided is an information processing apparatus including: a voice analysis unit which performs an analysis process for a user speech; and a data processing unit which is input with analysis results of the voice analysis unit to determine a process which is to be performed by the information processing apparatus, wherein in the case where a factor of inhibiting process continuation occurs in a process based on the user speech, the data processing unit performs a process of generating and outputting feedback information corresponding to a process stage in which the factor of inhibiting occurs.

14 Claims, 18 Drawing Sheets

| | (X) | (Y) | (Z) |
|---|---|---|---|
| | ASPECT OF INSUFFICIENCY OF FEEDBACK TO USER | DETAILS OF FEEDBACK INFORMATION THROUGH AVATAR | EXAMPLE OF OUTPUT OF FACIAL EXPRESSION OF AVATAR AND APPARATUS PROCESSING INFORMATION |
| (A) | WHEN DON'T YOU KNOW I CAN TALK TO YOU? | THE APPARATUS (SYSTEM) EXPRESSES IT IS IN A STANDBY STATE FOR USER'S SPEECH | PLEASE, INSTRUCT ME |
| (B) | DON'T YOU KNOW WHETHER THE SPEECH IS INPUT TO THE APPARATUS (SYSTEM)? | THE APPARATUS (SYSTEM) EXPRESSES IT LISTENS TO THAT | I LISTEN TO THE STORY |
| (C) | DON'T YOU KNOW WHETHER THE APPARATUS (SYSTEM) UNDERSTANDS THE SPEECH? | THE APPARATUS (SYSTEM) EXPRESSES IT UNDERSTANDS THAT | I UNDERSTAND |
| (D) | DON'T YOU KNOW WHETHER THE APPARATUS (SYSTEM) PERFORMS THE PROCESS BASED ON THE SPEECH? | THE APPARATUS (SYSTEM) EXPRESSES IT IS PERFORMING THE PROCESS | I'M PERFORMING THE PROCESS |

(56) References Cited

U.S. PATENT DOCUMENTS

| | | |
|---|---|---|
| 2008/0059178 A1* | 3/2008 | Yamamoto et al. ........... 704/251 |
| 2008/0104512 A1* | 5/2008 | Tarlton et al. ................. 715/706 |
| 2008/0167878 A1* | 7/2008 | Hause et al. .................. 704/270 |
| 2008/0215516 A1* | 9/2008 | Chaar et al. .................... 706/46 |
| 2009/0313019 A1* | 12/2009 | Kato et al. .................... 704/254 |
| 2009/0326957 A1* | 12/2009 | Yang et al. .................... 704/275 |
| 2011/0071830 A1* | 3/2011 | Kim et al. ..................... 704/246 |
| 2011/0172873 A1* | 7/2011 | Szwabowski et al. .......... 701/30 |
| 2011/0193726 A1* | 8/2011 | Szwabowski et al. ........ 340/996 |

\* cited by examiner

FIG. 4

| | CURRENT PROBLEM | CONFIGURATION AND PROCESS OF INFORMATION PROCESSING UNIT ACCORDING TO THE INVENTION |
|---|---|---|
| (1) | IT IS DIFFICULT TO UNDERSTAND A CHANGE OF START AND END OF INTERACTION | INTERACTION STATE IS DISPLAYED, SO THAT THE CURRENT STATE CAN BE CHECKED |
| (2) | I DON'T KNOW HOW I CAN DO WHEN I'M IN TROUBLE | AVATAR (VIRTUAL CHARACTER) IS DISPLAYED AS A DEPUTY OF THE APPARATUS (SYSTEM), SO THAT A ENVIRONMENT FOR ASKING THE AVATAR IS SET |
| (3) | THERE IS UNPLEASANT FEELING WHEN TALKING TO A APPARATUS (TV OR THE LIKE) | THE AVATAR (VIRTUAL CHARACTER) IS SET AS A DEPUTY OF THE APPARATUS (SYSTEM) |
| (4) | FEEDBACK TO THE USER IS INSUFFICIENT | FEEDBACK INFORMATION IS SEQUENTIALLY SUPPLIED THROUGH THE AVATAR |

FIG. 5

| (X) ASPECT OF INSUFFICIENCY OF FEEDBACK TO USER | (Y) DETAILS OF FEEDBACK INFORMATION THROUGH AVATAR | (Z) EXAMPLE OF OUTPUT OF FACIAL EXPRESSION OF AVATAR AND APPARATUS PROCESSING INFORMATION |
|---|---|---|
| (A) WHEN DON'T YOU KNOW I CAN TALK TO YOU? | THE APPARATUS (SYSTEM) EXPRESSES IT IS IN A STANDBY STATE FOR USER'S SPEECH | "PLEASE, INSTRUCT ME" |
| (B) DON'T YOU KNOW WHETHER THE SPEECH IS INPUT TO THE APPARATUS (SYSTEM)? | THE APPARATUS (SYSTEM) EXPRESSES IT LISTENS TO THAT | "I LISTEN TO THE STORY" |
| (C) DON'T YOU KNOW WHETHER THE APPARATUS (SYSTEM) UNDERSTANDS THE SPEECH? | THE APPARATUS (SYSTEM) EXPRESSES IT UNDERSTANDS THAT | "I UNDERSTAND" |
| (D) DON'T YOU KNOW WHETHER THE APPARATUS (SYSTEM) PERFORMS THE PROCESS BASED ON THE SPEECH? | THE APPARATUS (SYSTEM) EXPRESSES IT IS PERFORMING THE PROCESS | "I'M PERFORMING THE PROCESS" |

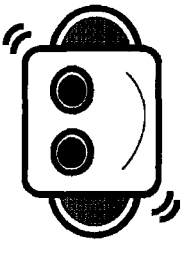

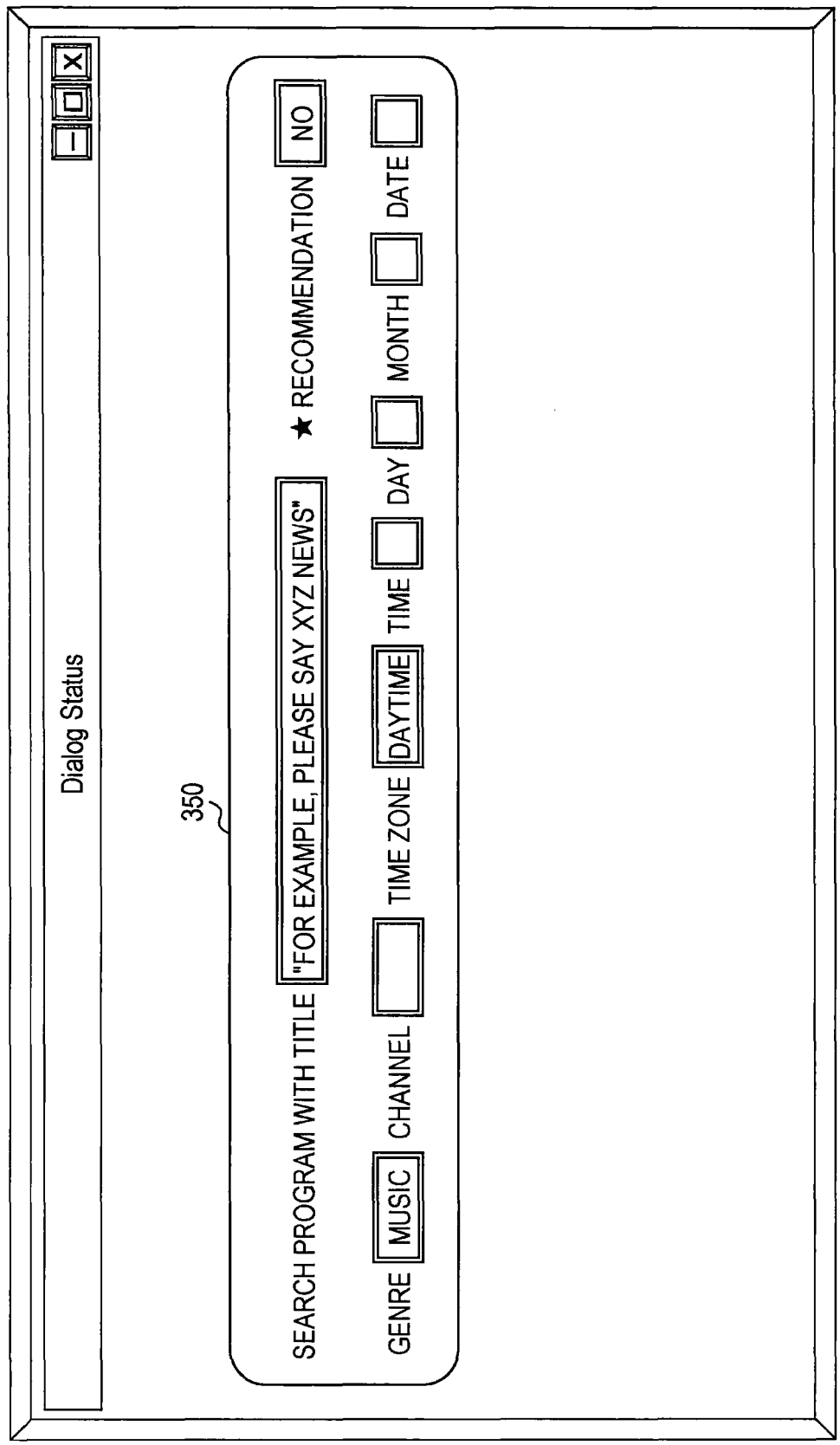

FIG. 15

| | DETAILS OF PROCESS (Processing Stage) | PROCESS RESULTS (Outcome) | EXAMPLE OF VISUALIZATION OF AVATAR (Avatar visualization) |
|---|---|---|---|
| (1) | ACOUSTIC ANALYSIS (S101) | VOICE (Success) | VISUALIZATION OF EMPHASIZE EARS HEAD IS SHAKEN |
| (2) | MEANING EXTRACTION (S102) | REJECTION OF NON-VOICE (Failure) | |
| (3) | RELIABILITY CALCULATION (S103) | REJECT MEANINGLESS SPEECH (Failure) | |
| (4) | ENVIRONMENT UNDERSTANDING (S104) | REJECT LOW-RELIABILITY SPEECH (Failure) | |
| (5) | USER MANAGEMENT (S105) | REJECT SPEECH OF USER OTHER THAN ASSOCIATED USER (Failure) | |
| (6) | CONVERSATION MANAGEMENT (S106) | REJECT SPEECH OTHER THAN SPEECH TO SYSTEM (Failure) | |
| | | NEGLECT AMBIGUOUS SPEECH (Failure) | |
| | | UNDERSTAND MEANING (Success) | |
| (7) | TASK MANAGEMENT (S107) | ANALYSIS WITH APPLICATION (Success) | |

FIG. 17

| | DETAILS OF PROCESS (Processing Stage) | PROCESS RESULTS (Outcome) | EXAMPLE OF VISUALIZATION OF AVATAR (Avatar visualization) |
|---|---|---|---|
| (1) | HAND DETECTION PROCESS WITH RESPECT TO IMAGE (S210) (Hand Detection in image) | SUCCESS (Success) | FACE IS SHAKEN SO AS TO EXPRESS SOMETHING TO BE SEEN |
| | | FAILURE (Failure) | a → b |
| (2) | FINGER DETECTION PROCESS (S220) (Finger region detection) | FAILURE (Failure) | a → b |
| (3) | HAND PATTERN RECOGNITION (S230) (Hand shape pattern recognition) | FAILURE (Failure) | a → c |
| (4) | ACTION (GESTURE) IDENTIFICATION PROCESS (S240) (Gesture recognition) | FAILURE (Failure) | a → c |
| | | SUCCESS (Success) | a → d |
| (5) | TASK MANAGEMENT | ANALYSIS WITH APPLICATION | d → e |

INFORMATION PROCESSING APPARATUS, INFORMATION PROCESSING METHOD, AND PROGRAM FOR PROVIDING FEEDBACK ON A USER REQUEST

BACKGROUND OF THE INVENTION

1. Field of the Invention

The present invention relates an information processing apparatus, an information processing method, and a program, and more particularly, to an information processing apparatus, an information processing method, and a program of performing various processes based on user's speech or action.

2. Description of the Related Art

When a user operates a PC, a TV, a recording/reproducing apparatus, or other various home appliances, the user manipulates an input unit, a remote controller, or the like provided to each apparatus to allow the apparatus to perform a desired process. For example, in many cases of using a PC, a keyboard or a mouse is used as an input device. In addition, in many cases of a TV, a recording/reproducing apparatus, or the like, a remote controller is used to perform various processes, for example, channel changing, reproducing content selection, or the like.

A variety of researches have been made into a system of performing instruction to various apparatuses by using user speech or action (gesture). More specifically, there is a system of recognizing user speech by using a voice recognition process, a system of recognizing user action or gesture by using an image process, or the like.

In addition to general input devices such as a remote controller, a keyboard, or a mouse, an interface of performing communication with a user by using a plurality of various communication modes such as voice recognition or image recognition is referred to as a multi-modal interface. The multi-modal interface in the related art is disclosed in, for example, U.S. Pat. No. 6,988,072.

However, a voice recognition apparatus or an image recognition apparatus used for the multi-modal interface or the like has a limitation in a processing capability, so that the understandable user speech or action is limited. Therefore, in the current state, in many cases, the user's intention may not be transferred to the system side.

SUMMARY OF THE INVENTION

It is desirable to provide an information processing apparatus, an information processing method, and a program where in a configuration of inputting voice information or image information such as a user speech or action (gesture) in the information processing apparatus and performing a process, during communication between a user and the apparatus, various types of feedback information are supplied to the user so as to increase a degree of mutual understanding between a system and the user, so that a correct process based on a correct understanding of the user's request can be performed.

According to an embodiment of the invention, there is provided an information processing apparatus including: a voice analysis unit which performs an analysis process for a user speech; and a data processing unit which is input with analysis results of the voice analysis unit to determine a process which is to be performed by the information processing apparatus, wherein in the case where a factor of inhibiting process continuation occurs in a process based on the user speech, the data processing unit performs a process of generating and outputting feedback information corresponding to a process stage in which the factor of inhibiting occurs.

In addition, in the information processing apparatus according to the embodiment of the invention, the information processing apparatus further includes an image analysis unit which analyzes a user action, and wherein the data processing unit is input with analysis results of the image analysis unit to determine a process which is to be performed by the information processing apparatus, and in the case where a factor of inhibiting process continuation occurs in a process based on the user action, the data processing unit performs a process of generating and outputting feedback information corresponding to a process stage in which the factor of inhibiting occurs.

In addition, in the information processing apparatus according to the embodiment of the invention, the data processing unit performs a process of displaying an avatar as a status indicator of the information processing apparatus as the feedback information in the display unit and changing an appearance of the displayed avatar.

In addition, in the information processing apparatus according to the embodiment of the invention, the data processing unit performs a process of displaying an avatar as a status indicator of the information processing apparatus as the feedback information in the display unit and changing a facial expression of the displayed avatar.

In addition, in the information processing apparatus according to the embodiment of the invention, the data processing unit performs a process of displaying an avatar as a status indicator of the information processing apparatus as the feedback information in the display unit and outputting information describing a status of the information processing apparatus through the displayed avatar.

In addition, in the information processing apparatus according to the embodiment of the invention, in the case where a process based on the user speech or the user action succeeds, the data processing unit performs a process of displaying an avatar as a status indicator of the information processing apparatus as the feedback information in the display unit and changing a facial expression of the displayed avatar or outputting information describing that the information processing apparatus succeeds in the process through the avatar.

In addition, according to another embodiment of the invention, there is provided an information processing method of performing an information process in an information processing apparatus, including the steps of: performing an analysis process for a user speech in an voice analysis unit; and inputting with analysis results of the performing of the analysis process to determine a process which is to be performed by the information processing apparatus in a data processing unit, wherein the inputting with the analysis results to determine the process includes a step of, in the case where a factor of inhibiting process continuation occurs in a process based on the user speech, performing a process of generating and outputting feedback information corresponding to a process stage in which the factor of inhibiting occurs.

In addition, according to still another embodiment of the invention, there is provided a program executing an information process in an information processing apparatus, including the steps of: allowing an voice analysis unit to perform an analysis process for a user speech; and allowing a data processing unit to be inputting with analysis results of the allowing the voice analysis unit to perform the analysis process for the user speech to determine a process which is to be performed by the information processing apparatus, wherein the allowing the data processing unit to be inputting with the analysis results to determine the process includes a step of, in the case where a factor of inhibiting process continuation occurs in a process based on the user speech, allowing the data processing unit to perform a process of generating and outputting feedback information corresponding to a process stage in which the factor of inhibiting occurs.

In addition, the program according to the embodiment of the invention is a program which may be provided to, for example, an information processing apparatus or a computer system which can execute various types of program codes by a storage medium or a communication medium which is provided in a computer-readable format. The program is provided in a computer-readable format, so that a process according to the program can be implemented in the information processing apparatus or the computer system.

The other objects, features, and advantages of the invention will be clarified in a more detailed description through the later-described embodiments of the invention and the attached drawings. In addition, in the specification, a system denotes a logical set configuration of a plurality of apparatuses, but the apparatus of each configuration is not limited to be in the same casing.

According to a configuration of an embodiment of the invention, there are provided an apparatus and method of outputting feedback information when continuous processing is difficult in an information processing apparatus where an input according to a user speech or action can be performed. A voice analysis of the user speech or an analysis of a user action (gesture) is performed, and a process of the information processing apparatus is determined based on the analysis results. In addition, in the process of the information processing apparatus based on the user speech or the user action, in the case where a factor of inhibiting the process continuation occurs, the feedback information corresponding to a process stage where the factor of inhibiting occurs is generated and output. The user acquires the feedback information, so that the user can immediately acquire an error occurring situation according to the process stage. Accordingly, it is possible to perform an error treatment process such as re-speech without performance of a useless process such as a standby process.

BRIEF DESCRIPTION OF THE DRAWINGS

FIG. 4 is a diagram illustrating an example of a process performed by the information processing apparatus according to the invention.

FIG. 5 is a diagram illustrating an example of a process performed by the information processing apparatus according to the invention.

FIG. 6 is a diagram illustrating an example of the avatar which is a process performed by the information processing apparatus according to the invention.

FIG. 7 is a diagram illustrating an example of a process performed by the information processing apparatus according to the invention.

FIG. 15 is a diagram illustrating a modified example of the avatar displayed by the information processing apparatus according to the invention during the performance of the process in correspondence with the user speech.

FIG. 17 is a diagram illustrating a modified example of the avatar displayed by the information processing apparatus according to the invention during the performance of the process in correspondence with the user action (gesture).

DESCRIPTION OF THE PREFERRED EMBODIMENTS

Hereinafter, an information processing apparatus, an information processing method, and a program according to the invention will be described with reference the drawings. In addition, the description is made in the following order.

1. Overview of Processes Performed by Information Processing Apparatus According to the Invention 2. Example of Configuration of Information Processing Apparatus According to the Invention 3. Example of Processes Performing Improvement of Mutual Understanding by Feedback and Guidance (Guide Information Display Section) to User (3-1) Example of Feedback Process Using Avatar (3-2) Example of Process Performing Guidance (Guide Information Display Section) on Inputtable Information of User (3-3) Example of Process Simultaneously Using Feedback Information and Guidance (Guide Information Display Section) Information to User (3-4) User Classification Process 4. Example of Process for Understanding of Necessity of User Input or Input Timing by Feedback to User (4-1) Example of Feedback Process on User Speech (4-2) Example of Feedback Process for User Action (Gesture)

5. Example of Hardware Configuration of Information Processing Apparatus

[1. Overview of Processes Performed by Information Processing Apparatus According to the Invention]

Figure 1:
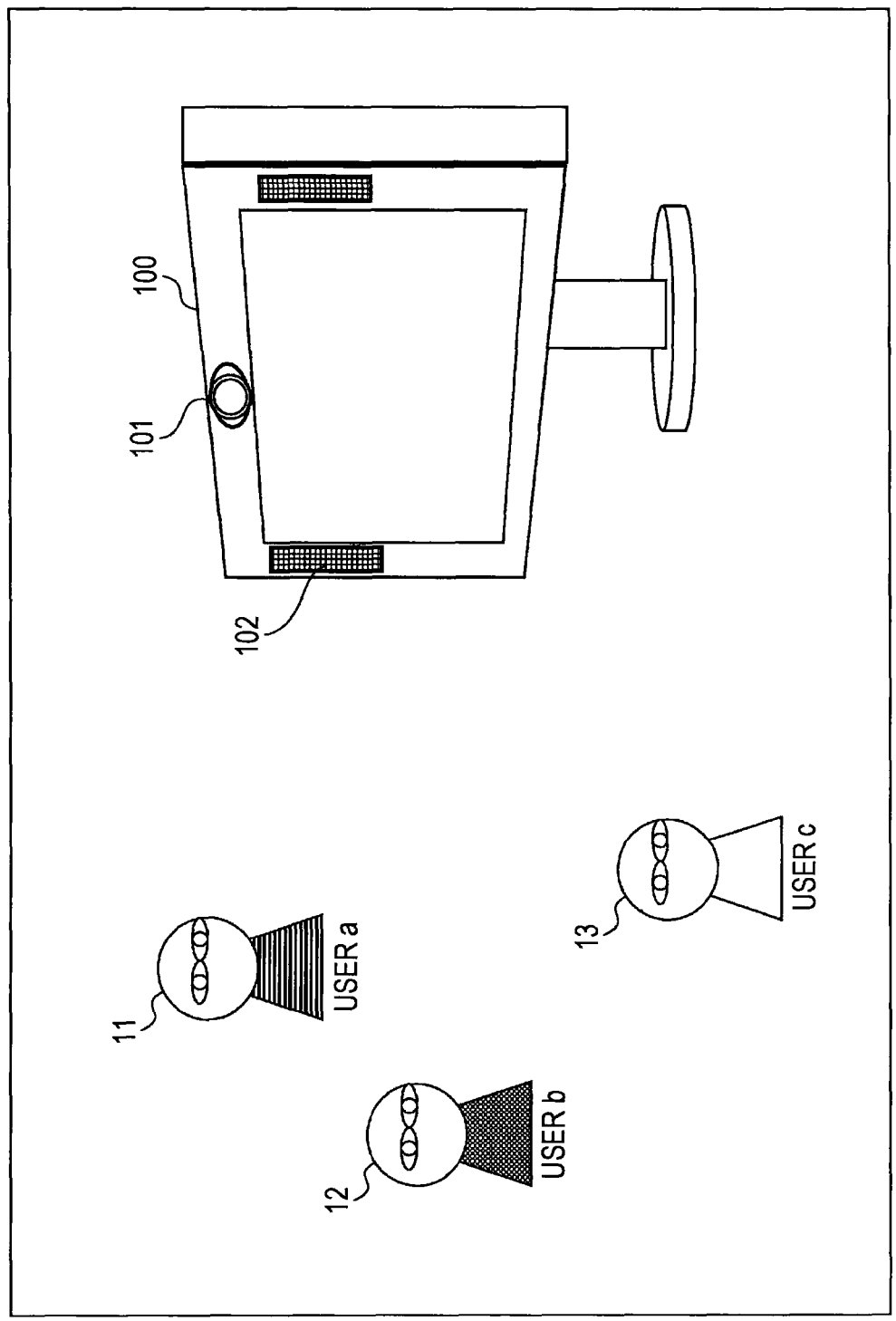
FIG. 1 is a diagram illustrating an example of usage of an information processing apparatus according to the invention.

First, the overview of processes performed by an information processing apparatus according to the invention is described with reference to FIG. 1. In FIG. 1, a television set is illustrated as an example of the information processing apparatus according to the invention. The information processing apparatus 100 performs, for example, a display process of broadcasting contents, a reproducing process of contents recorded in a built-in recording/reproducing apparatus, for example, a hard disk, a DVD, or Blu-ray disk, or the like, a recording process for a program in the recording/reproducing apparatus, or the like.

A plurality of users exists in front of the information processing apparatus 100. In the example illustrated in the figure, there are a user a, 11, a user b, 12, and a user c, 13. The users perform various requests on the information processing apparatus 100. For example, the requests are requests for channel changing, volume adjusting, starting a recording process, displaying a recorded content list, selecting and reproducing a content from the list, and the like. In addition, the requests include requests for stopping the reproduction, forward winding, and the like.

The user performs the request by using a voice, that is, a speech. The information processing apparatus 100 includes a camera 101 and a voice input/output unit 102 having a microphone and a speaker. The speech made by the users a to c, 11 to 13 is input though the voice input/output unit 102 having a microphone and a speaker to the information processing apparatus 100. In addition, an image of the users a to c, 11 to 13 is input through the camera 101 to the information processing apparatus 100.

The information processing apparatus 101 analyzes the input information to determine an action which the apparatus is to perform and performs the action. In the case where the user's request can be understood, the process in response to the request is performed. For example, the process is a channel changing process, a content selecting/reproducing process, or the like.

In addition, the information processing apparatus 101 performs a feedback process to the user sequentially during the communication with the user. For example, the checking display of the details of the user speech, the response of the information processing apparatus, or the like is supplied to the user. More specifically, for example, in the case where the user's request is not understood or in the case where the request is not performed, the information processing apparatus 101 performs a feedback process for explaining the status to the user. The detailed processes are described later.

[2. Example of Configuration of Information Processing Apparatus According to the Invention]

Next, an example of a Configuration of an information processing apparatus according to the invention is described with reference to FIG. 2. The information processing apparatus 100 illustrated in FIG. 2 corresponds to, for example, the information processing apparatus 100 illustrated in FIG. 1. In addition, the information processing apparatus according to the invention is not limited to a TV, but it may be implemented as a PC, a recording/reproducing apparatus, or other various home appliances. In other words, it is an information processing apparatus which performs various processes according to user's request.

Figure 2:
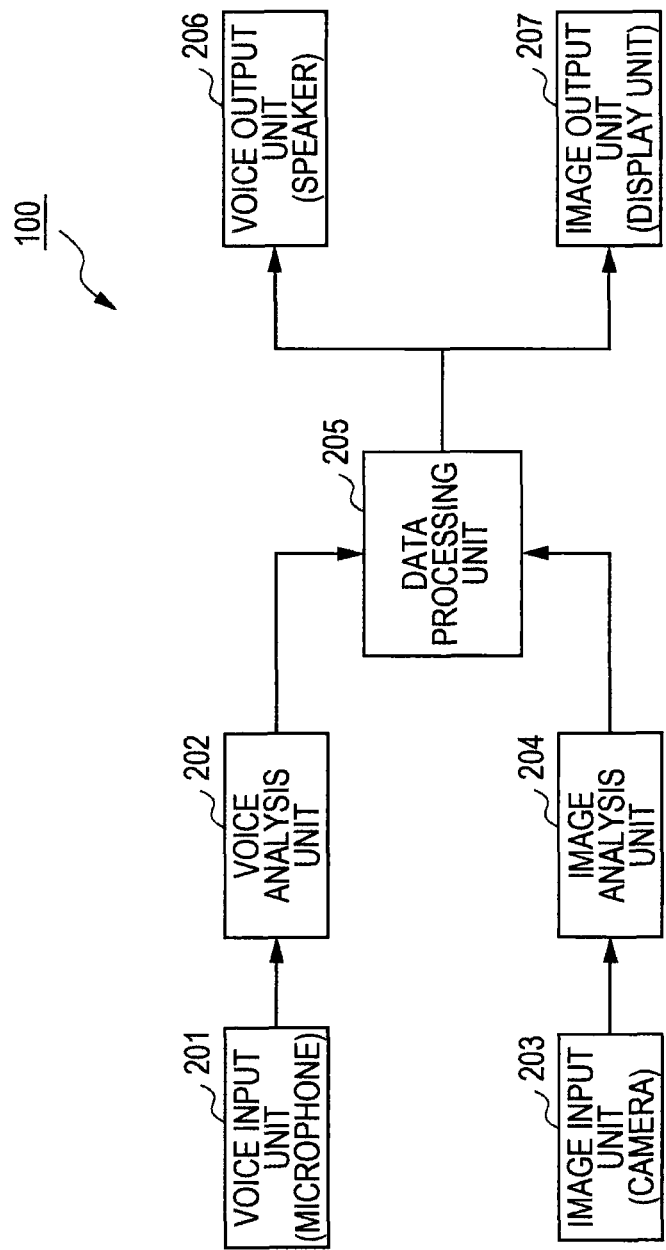
FIG. 2 is a block diagram illustrating an example of configuration of the information processing apparatus according to the invention.

As illustrated in FIG. 2, the information processing apparatus 100 includes a voice input unit (microphone) 201, a voice analysis unit 202, an image input unit (camera) 203, an image analysis unit 204, a data processing unit 205, a voice output unit (speaker) 206, and an image output unit (display unit) 207.

The voice input unit (microphone) 201 inputs voice information of a periphery of the information processing apparatus 200, for example, a user speech. The voice information input by the voice input unit (microphone) 201 is input to the voice analysis unit 202. The voice analysis unit 202 includes a dictionary for voice analysis in the storage unit. The voice analysis unit 202 analyzes words in the user speech by using the dictionary and inputs the analysis information to the data processing unit 205.

The image input unit (camera) 203 inputs an image of a periphery of the information processing apparatus 200, for example, an image of a user. The image photographed by the image input unit (camera) 203 is input to the image analysis unit 204. The image analysis unit 204 performs, for example, an identification process on a user included in the photographed image by using registered information, such as user face information, which is stored in advance in the storage unit. More specifically, the image analysis unit 204 analyzes location of the user, identity of the user, or the like. The analysis information is input to the data processing unit 205.

The data processing unit 205 receives the voice analysis information input from the voice analysis unit 202 and the image analysis information input from the image analysis unit 204 and determines a process (action) which is to be performed by the information processing apparatus according to the input information. In other words, as described above, in the case where the user's request can be understood, a process according to the request is performed. For example, the process may be a channel changing process, a content selecting/reproducing process, or the like.

In addition, (the data processing unit 205 performs processes of generating and outputting the feedback information indicating the recognition result of the information processing apparatus on the user speech or the user action (gesture). For example, in the case where the user's request is not understood, the case where the user's request is not performed, or the like, feedback information for explaining the status is generated, and the generated feedback information is displayed or output as voice.

The feedback process is performed by any one of the voice output through the voice output unit (speaker) 206 and the image output through the image output unit (display unit) 207 or a combination thereof. Hereinafter, specific details are described in detail.

[3. Example of Processes Performing Improvement of Mutual Understanding by Feedback and Guidance (Guide Information Display Section) to User]

Next, as an example of a process performed by the information processing apparatus according to the invention, (an example of processes performing improvement of mutual understanding by feedback and guidance (guide information display section) to a user is described.

As described above, in the multi-modal interface employing the voice recognition or the image recognition, so that (the voice recognition apparatus or image recognition apparatus used for the multi-modal interface has a limitation in the processing capability, so that the understandable user speech or action (gesture) is limited. As a result, there is a problem in that the user's intention may not be transferred to the system side, so that the process corresponding to the user's intention may not be performed. The example of the process described hereinafter is the example of the process for solving the problem. More specifically, the example is an example of the processes performing improvement of mutual understanding by the feedback and the guidance (guide information display section) to the user.

Hereinafter, as the example is an example of the processes performing improvement of mutual understanding by the feedback and the guidance (guide information display section) to the user, the following three detailed example of a processes are sequentially described.

(3-1) Example of Feedback Process Using Avatar (3-2) Example of Process Performing Guidance (Guide Information Display Section) on Inputtable Information of User (3-3) Example of Process Simultaneously Using Feedback Information and Guidance (Guide Information Display Section) Information to User (3-4) User Classification Process (3-1) Example of Feedback Process Using Avatar First, an example of a feedback process using an avatar as a status indicator of an information processing apparatus is described.

An example of a detailed process performed by the information processing apparatus is described with reference to FIG. 3.

Figure 3:
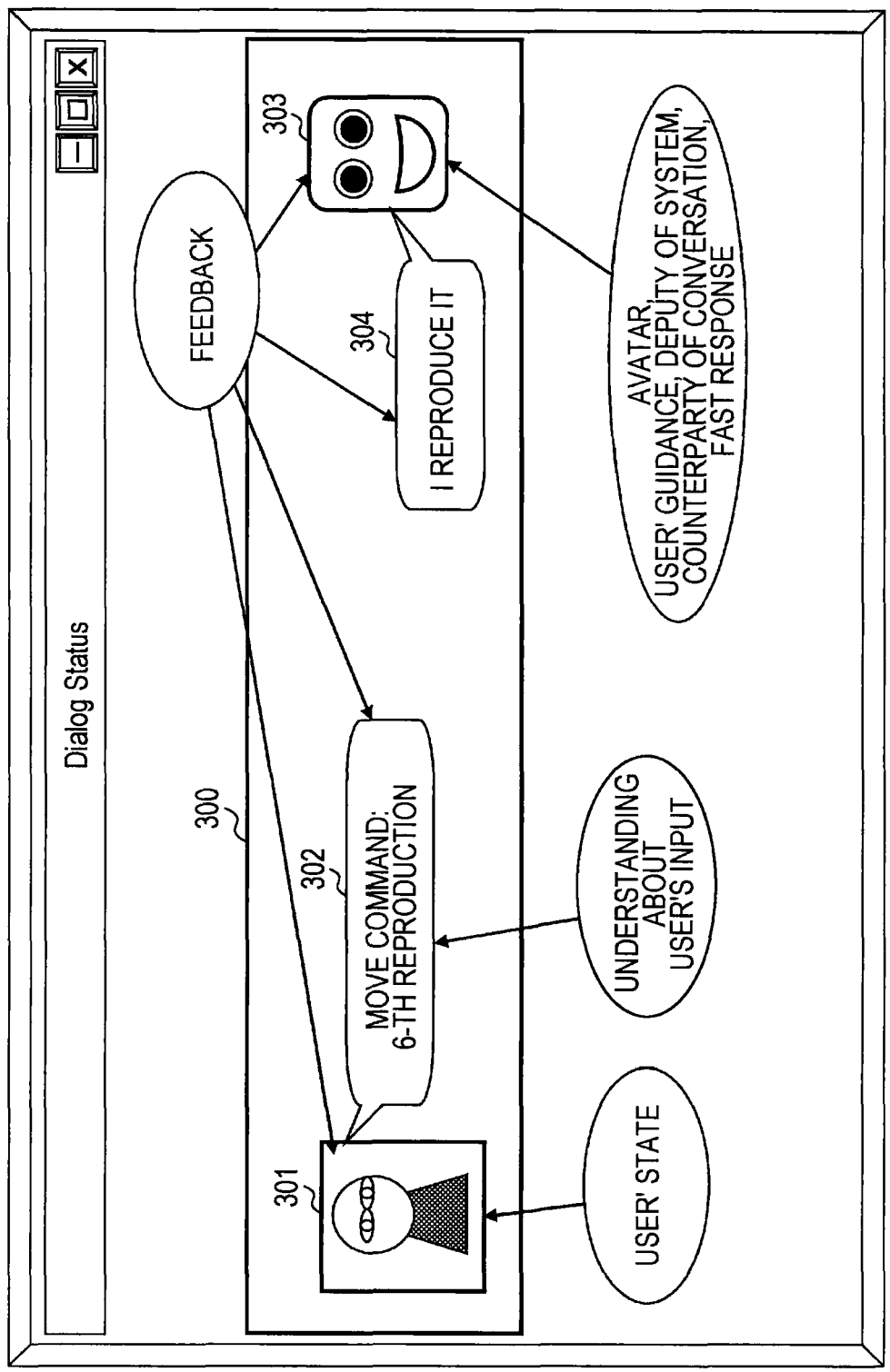
FIG. 3 is a diagram illustrating an example of a process performed by the information processing apparatus according to the invention.

FIG. 3 illustrates an example of display of the display unit of the information processing apparatus 100, for example, a TV or the like illustrated in FIG. 1. The information processing apparatus 100 analyzes the user speech or gesture and performs a process according to the analysis result. For example, the process is a channel changing process, a content selecting/reproducing process, a recording process, or the like.

FIG. 3 illustrates an example where a user performs a process request based on the speech or action (gesture) and the information processing apparatus 100 is input with the speech or action (gesture), performs analysis thereof, and performs data display on the display unit as a feedback process to the user.

A feedback information display area 300 is set in the display unit. A user image 301 of the user communicating with the information processing apparatus 100 is presented as user identification information in the feedback information display area 300.

The user image 301 is an image which the image analysis unit 204 illustrated in FIG. 2 specifies by performing a process of matching with pre-registered face image data based on a face of a person identified from the image input through the image input unit 203. In addition, the user image 301 presented in the feedback information display area 300 may be a raw image photographed by the image input unit 203 or a registered image stored in the storage unit of the information processing apparatus 100.

By viewing the user image 301, the user can check that the user recognized by the information processing apparatus 100 is the correct user oneself.

For example, in the case where a face of the incorrect user is displayed as the user image 301, the user performs the input of the speech or the like that "the user is not correct" to notify the misrecognition of the user to the information processing apparatus 100.

In addition, the avatar (virtual character) 303 which can be recognized as a counterparty of the conversation with the user is presented in the feedback information display area 300. The avatar 303 is a virtual character, which performs talking to the user, as a status indicator of the information processing apparatus 100.

Due to the presentation of the avatar 303, the user thinks that the counterparty of the conversation is not an apparatus but an avatar, so that more accustomed conversation can be implemented.

In addition, the avatar 303 changes its facial expression according to the understanding level of the user input (speech or action), the process performed by the information processing apparatus 100, or the like. The user can understand the status or the like of the information processing apparatus based on the change in the facial expression of the avatar. The detailed example is described later.

In addition, the user input information 302 according to the speech or the like from the user is displayed in the feedback information display area 300. The user input information is a data of the result of the analysis of the user speech or gesture performed by the information processing apparatus 100. For example, the user input information is the details of the user speech based on the voice recognition result for the user speech or the details of the request recognized by the information processing apparatus based on the user action (gesture) obtained by the image analysis.

If there is an error in the analysis of the information processing apparatus 100, the erroneous information is displayed.

The user can determines based on the display of the user input information 302 whether or not the information processing apparatus 100 does correctly understand the request.

For example, in the case where the display of the user input information 302 different from the actual request of the user is performed, the user performs the input of the speech or the like that "The request is not correct" to notify the misunderstanding of the user input to the information processing apparatus 100.

In addition, in the feedback information display area 300, as the speech of the avatar 303, the apparatus process information 304 indicating a response of the information processing apparatus or an apparatus state is displayed. In the example illustrated in the figure, the apparatus process information 304 says that "I reproduce it".

This is the process of the information processing apparatus 100 corresponding to the user input "movement command: sixth reproduction".

If there is an error in the analysis of the information processing apparatus 100, the erroneous process information is displayed.

The user can determines based on the display of the apparatus process information 304 whether or not the information processing apparatus 100 correctly understands the request and is to perform the correct process according to the request of the user.

For example, in the case where the display of the apparatus process information 304 corresponding to the process different from the actual request of the user is performed, the user performs the input of the speech or the like that "the process is not correct" to notify to the information processing apparatus 100 that the performed process is erroneous.

In this manner, the information processing apparatus according to the invention presents as the feedback information to the user the following information: checking of correctness of the user classification process according to the presentation of the user image 301; checking of correctness of analysis of the user input according to the display of the user input information 302; and checking of a state of the information processing apparatus according to the avatar 303 and the apparatus process information 304.

The user can easily check based on the feedback information whether or not the information processing apparatus 100 correctly understands the user and the request of the user. Therefore, in the case where there is an error, the detailed error can be notified to the information processing apparatus.

The correspondence between the current problems of the multi-modal interface employing the voice recognition or the image recognition and the processes performed by the information processing apparatus according to the invention is described with reference to a table illustrated in FIG. 4.

As the current problems, for example, Problems (1) to (4) are illustrated in FIG. 4.

For example, the problem (1) is that it is difficult to understand a change of start and end of interaction.

In order to solve the problem, the information processing apparatus according to the invention displays the interaction state so that the current state can be checked. More specifically, as illustrated in FIG. 3, a user image 301, user input information 302, an avatar 303, and apparatus process information 304 are displayed.

In addition, as the current problem, the problem (2) is that the user may not know how to do in trouble. In order to solve the problem, the information processing apparatus according to the invention displays an avatar as a status indicator of the apparatus (system), so that an environment of asking the avatar is set.

In addition, as the current problem, the problem (3) is that there is unpleasant feeling when talking to an apparatus (TV or the like). In order to solve the problem, the information processing apparatus according to the invention sets the avatar as a status indicator of the apparatus (system).

In addition, as the current problem, the problem (4) is that feedback to the user is insufficient. In order to solve the problem, the information processing apparatus according to the invention is configured so that the feedback information is sequentially supplied through the avatar.

With respect to the problem (4) that the feedback to the user is insufficient illustrated in FIG. 4, in the information processing apparatus according to the invention, the feedback information is sequentially supplied by using the avatar 303 illustrated in FIG. 3. In addition, the speech of the avatar 303 is not only displayed in the display unit is but also output from the voice output unit (speaker) 206 as the voice information.

A detailed example of the feedback process employing the avatar 303 is described with reference to FIG. 5.

FIG. 5 illustrates the following corresponding data.

(X) statuses of insufficiency of feedback to user (Y) details of feedback information through avatar (Z) example of output of facial expression of avatar and apparatus process information (X) As the status of insufficiency of feedback to user, for example, the statuses (a) to (d) are illustrated in FIG. 5.

(a) When don't you know I can talk to you?

(b) Don't you know whether or not the speech is input to the apparatus (system)?

(c) Don't you know whether or not the apparatus (system) understands the speech?

(d) Don't you know whether or not the apparatus (system) performs the process based on the speech?

For example, a troubled situation may occur in the user based on the insufficiency of the feedback information as listed above by (a) to (d).

The data processing unit 205 of the information processing apparatus 100 according to the invention generates and outputs the feedback information solving the insufficiency of the feedback information.

More specifically, with respect to the question (a) "When don't you know I can talk to you?", as illustrated in (Z) of FIG. 5, as the speech of the avatar, the output (display and voice output) of the speech "Please, instruct me" is performed.

By the process, as illustrated in (Y), it is configured so that the apparatus (system) expresses that it is in standby state for the user speech.

(b) Don't you know whether or not the speech is input to the apparatus (system)?

With respect to the question, as illustrated in (Z) of FIG. 5, as the speech of the avatar, the output (display and voice output) of the speech "I listen to the story" is performed. In addition, the avatar which can be visually understood by emphasizing the listening state such as enlarging the ears of the avatar is displayed.

By the process, as illustrated in (Y), it is configured so that the apparatus (system) expresses that it listens to the user speech.

(c) Don't you know whether or not the apparatus (system) understands the speech?

With respect to this question, as illustrated in (Z) of FIG. 5, as a speech of the avatar, the output (display and voice output) of the speech "I understand" is performed. In addition, the avatar visually indicating the understanding such as making a smiling face as a facial expression of the avatar is displayed.

As illustrated in (Y), a configuration indicating that the apparatus (system) understands the user speech is made by the process.

(d) Don't you know whether or not the apparatus (system) performs the process based on the speech?

With respect to this question, as illustrated in (Z) of 5, the output (display and voice output) of the speech "I'm performing the process" as the speech of the avatar is displayed. As illustrated in (Y), a configuration indicating that the apparatus (system) is performing the process based on the user speech is made by the process.

In addition, various facial expressions of the avatar are set according to the process state of the information processing apparatus 100. Some examples are illustrated in FIG. 6. The examples of the avatars of FIG. 6 are the examples of the avatar set from the top as follows.

(a) is the example of the avatar expressing the state where the user listens to a story and the example of the avatar where the ears are emphasized.

(b) is the example of the avatar expressing the state where the avatar understands the story of the user and makes an action and the example of the avatar expressing a smiling face.

(c) is the example of the avatar indicating the state where the avatar does not listen to the story well and the example of the avatar indicating a facial expression of a non-hearing troubled state is set.

(d) is the example of the avatar indicating the state where the avatar does not understand the story of the user and the example of the avatar indicating a facial expression of a non-understandable troubled state.

(3-2) Example of Process Performing Guidance (Guide Information Display Section) on Inputtable Information of User Next, an example of a process Performing Guidance (guide information display section) on inputtable information of a user is described.

In the case where the user reproduces some recorded contents, for example, with respect to the information processing apparatus 100 illustrated in FIG. 1, a process of searching the content is necessary. At the searching time, efficient searching is implemented by setting various searching conditions.

The information processing apparatus according to the invention supplies, for example, information indicating which selection condition can be designated in units of a category with respect to the designation condition at the time of searching content to the user.

A detailed example of the process is described with reference to FIG. 7 and the following figure.

FIG. 7 illustrates a display example of the guide information display section-attached information input area 350 display on the display unit of the information processing apparatus 100 at the time of the reproducing content selection process.

As illustrated in the figure, the designatable information of the case of performing the content search may be information on, for example, a title, existence of recommendation, a genre, a channel, or a time zone.

However, it is difficult for a beginner to know which information can be really input in the information input section.

In consideration of the above circumstances, in the information processing apparatus according to the invention, the guidance information (guide information display section information) indicating which information can be input to each information input section is displayed. But, in addition to the display, the voice output is also performed.

For example, at the time of inputting for the initial title information input section, "for example, please input XYZ news" is displayed. By viewing the display, the user can understand that a program name may be input, so that the user immediately performs a correct input. In addition, the input is performed by, for example, the user speech.

Figure 8:
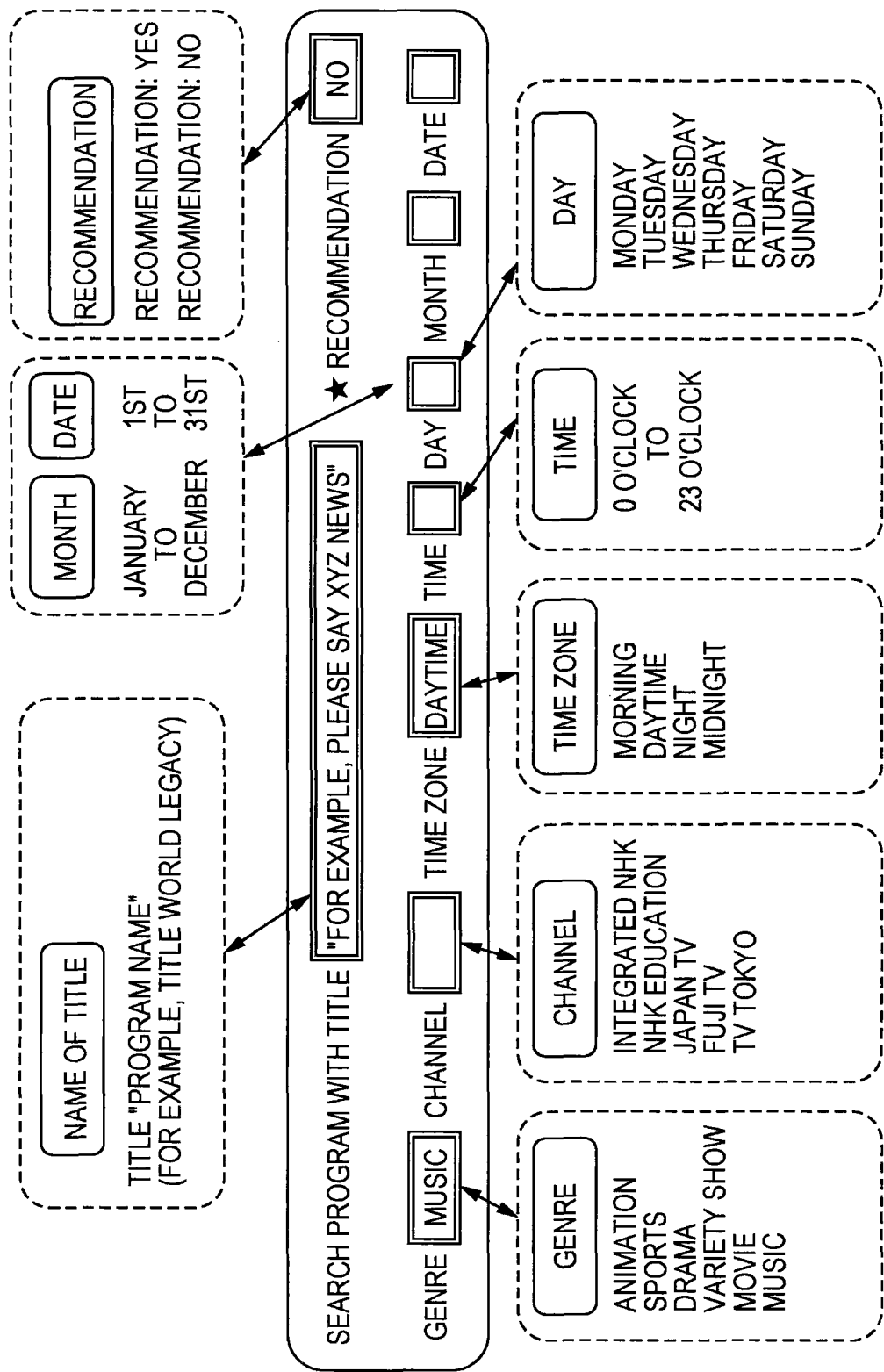
FIG. 8 is a diagram illustrating an example of a process performed by the information processing apparatus according to the invention.

Examples of display of the guidance information (guide information display section information) with respect to other information input sections are illustrated in FIG. 8.

As illustrated in FIG. 8, "for example, please input XYZ news" is displayed in the title information input section. This is the same as that described with reference to FIG. 7.

In the recommended information input section, one of "Yes" and "No" is presented, or a change display between "Yes" and "No" is performed. In the case where the input is determined by the user input, the changed display is switched into the regular display of the determined data.

In the genre section, any one of registered genre information such as an animation, sports, . . . , and music is displayed, or switching thereof is repeatedly displayed. In the case where the input is determined by the user input, the determined information is typically displayed.

In the channel section, any one of a plurality of registered channel information such as Integrated NHK is displayed, or switching thereof is repeatedly displayed. In the case where the input is determined by the user input, the determined information is typically displayed.

With respect to information of time zone, time, and day, any one of inputtable information is displayed, or switching thereof is sequentially displayed. In the case where the input is determined by the user input, the determined information is typically displayed.

In this manner, since inputtable information is shown to the user through each input section, the user can know the detailed inputtable information, so that the user can input correct information without confusion.

The example of display of the guidance information (guide information display section information) described with reference to FIGS. 7 and 8 is an example where the guidance information (guide information display section information) is embedded and displayed in the guide information display section-attached information input area 350, that is, an actual information input section. However, besides the example of display, as another configuration, an independent guide information display section information display area different from the information input section may be set to display the guidance information (guide information display section information).

Figure 9:
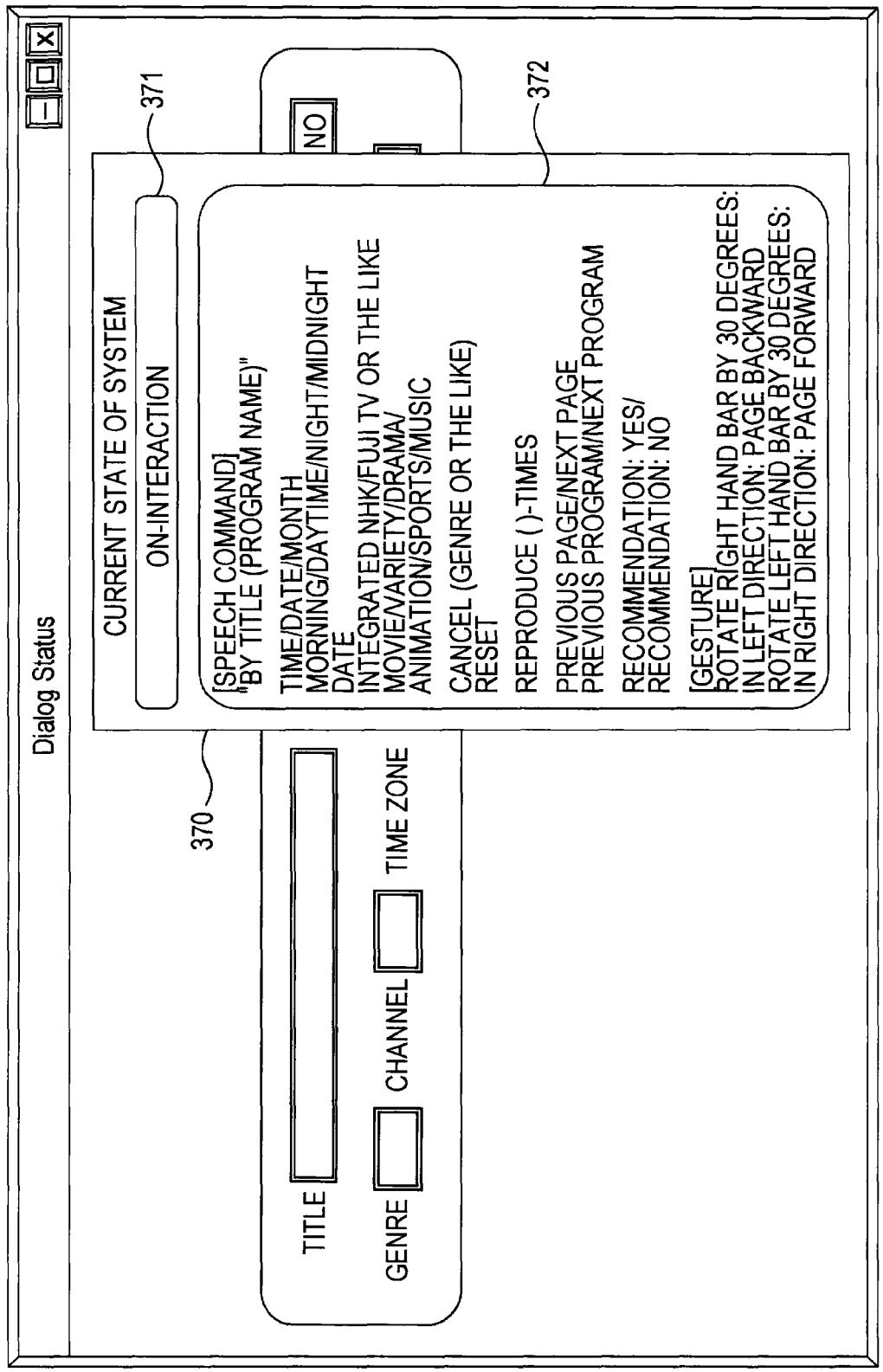
FIG. 9 is a diagram illustrating an example of a process performed by the information processing apparatus according to the invention.

More specifically, for example, the example of display is the same as that of the guide information display section information display area 370 illustrated in FIG. 9. An apparatus state display section 371 indicating the process status of the apparatus and a guide information display section 372 are set in the guide information display section information display area 370.

For example, as illustrated in the figure, the description of the process performed by the apparatus is displayed in the apparatus state display section 371. In this example, an example representing "during interaction" with respect to the user is illustrated.

First, the description of the status of the user input or the like described with reference to FIGS. 7 and 8 is displayed in the guide information display section 372.

In the example illustrated in the figure, the description of the input method based on the user speech is displayed in the "voice command" section in the upper portion of the guide information display section 372, and the description of the input method based on the user action (gesture) is displayed in the "gesture" section in the lower portion of the guide information display section 372.

By viewing the description, the user can easily perform a correct input in the data input sections.

(3-3) Example of Process Simultaneously Using Feedback Information and Guidance (Guide Information Display Section) Information to User Next, the aforementioned example of the process simultaneously using the feedback information and the guidance (guide information display section) information to the user is described with reference to FIG. 10.

Figure 10:
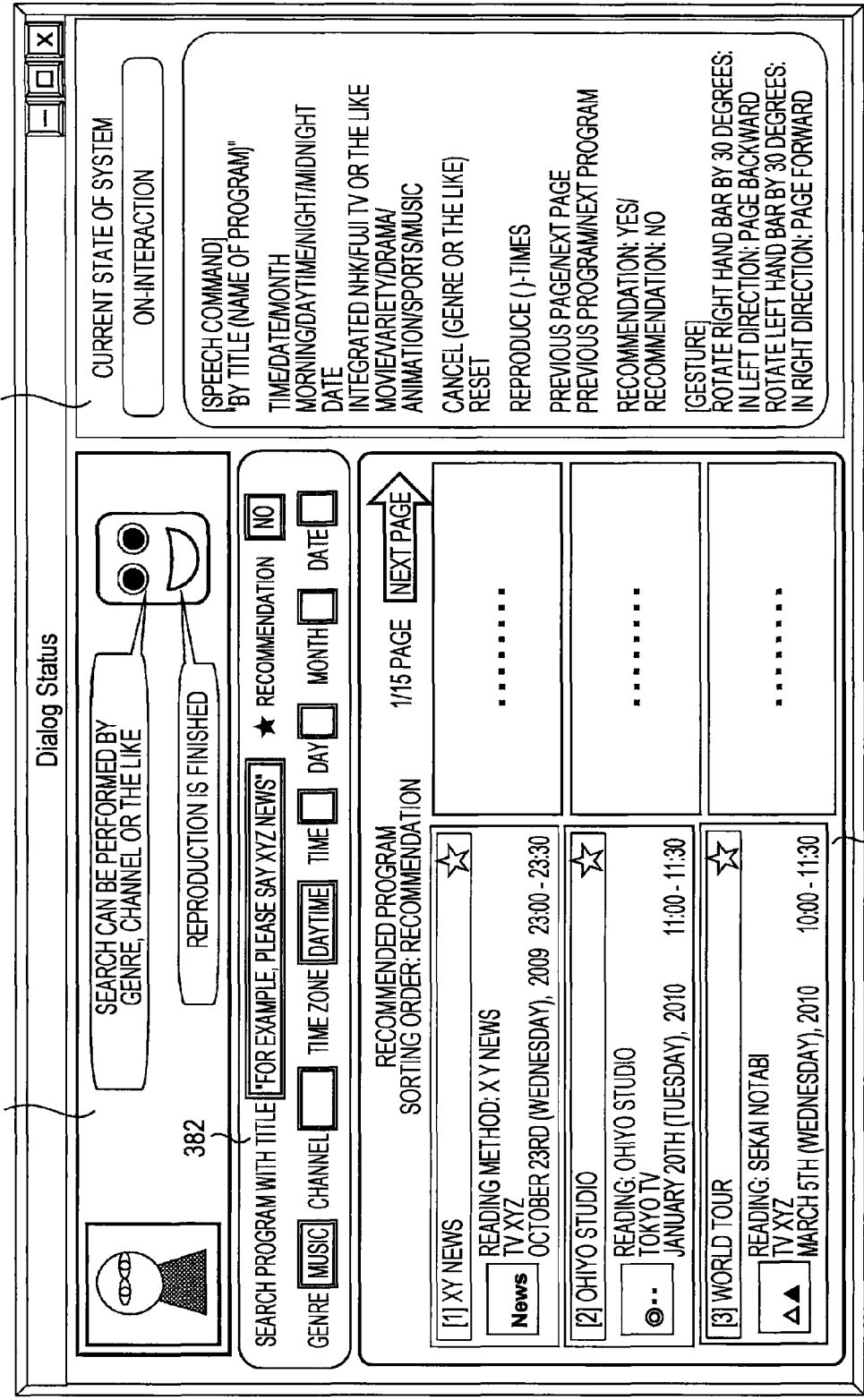
FIG. 10 is a diagram illustrating an example of a process performed by the information processing apparatus according to the invention.

FIG. 10 is a diagram illustrating an example of the display data of the display unit of the information processing apparatus 100, for example, the TV in FIG. 1, or the like.

The display data illustrated in FIG. 10 is configured with areas: a feedback information display area 381 where the conversation with the avatar can be set; a guide information display section-attached information input area 382 where the guidance (guide information display section) information is displayed in units of data input section; a guide information display section information display area 383 where independent guidance (guide information display section) information is displayed; and a content list display area 384.

The example of display is an example of data displayed in the display unit in the case of performing a process for selecting the reproducing content from the content displayed in the content list display area 384.

The feedback information display area 381 where the conversation with the avatar can be set is the display area of the feedback information corresponding to [(3-1) Example of Feedback Using Avatar] described above with reference to FIGS. 3 to 6D.

The guide information display section-attached information input area 382 where the guidance (guide information display section) information is described in units of data input section is the display area of the guidance (guide information display section) information corresponding to [(3-2) Example of Process Performing Guidance (Guide Information Display Section) on Inputtable Information of User] described above with reference to FIGS. 7 and 8.

The guide information display section information display area 383 where the independent guidance (guide information display section) information is displayed is the display area of the guidance (guide information display section) information corresponding to [(3-2) Example of Process Performing Guidance (Guide Information Display Section) on Inputtable Information of User] described above with reference to FIG. 9.

By simultaneously displaying the above information, the user performs the instruction to the information processing apparatus through the speech or the gesture without confusion.

(3-4) User Classification Process

Next, the user classification process is described. For example, in an environment similar to that of FIG. 1, a plurality of the users exists in front of the information processing apparatus 100. They are the users all to the users c13. The information processing apparatus 100 acquires an image of the area in front of the information processing apparatus 100 through a camera 101 (=the image input unit (camera) 203 of FIG. 2) and performs the user identification process by comparing the acquired image with the user face image, which is stored in advance in the storage unit, in the image analysis unit 204 illustrated in FIG. 2. The data processing unit 205 illustrated in FIG. 2 generates the feedback information of the identification result.

Figure 11:
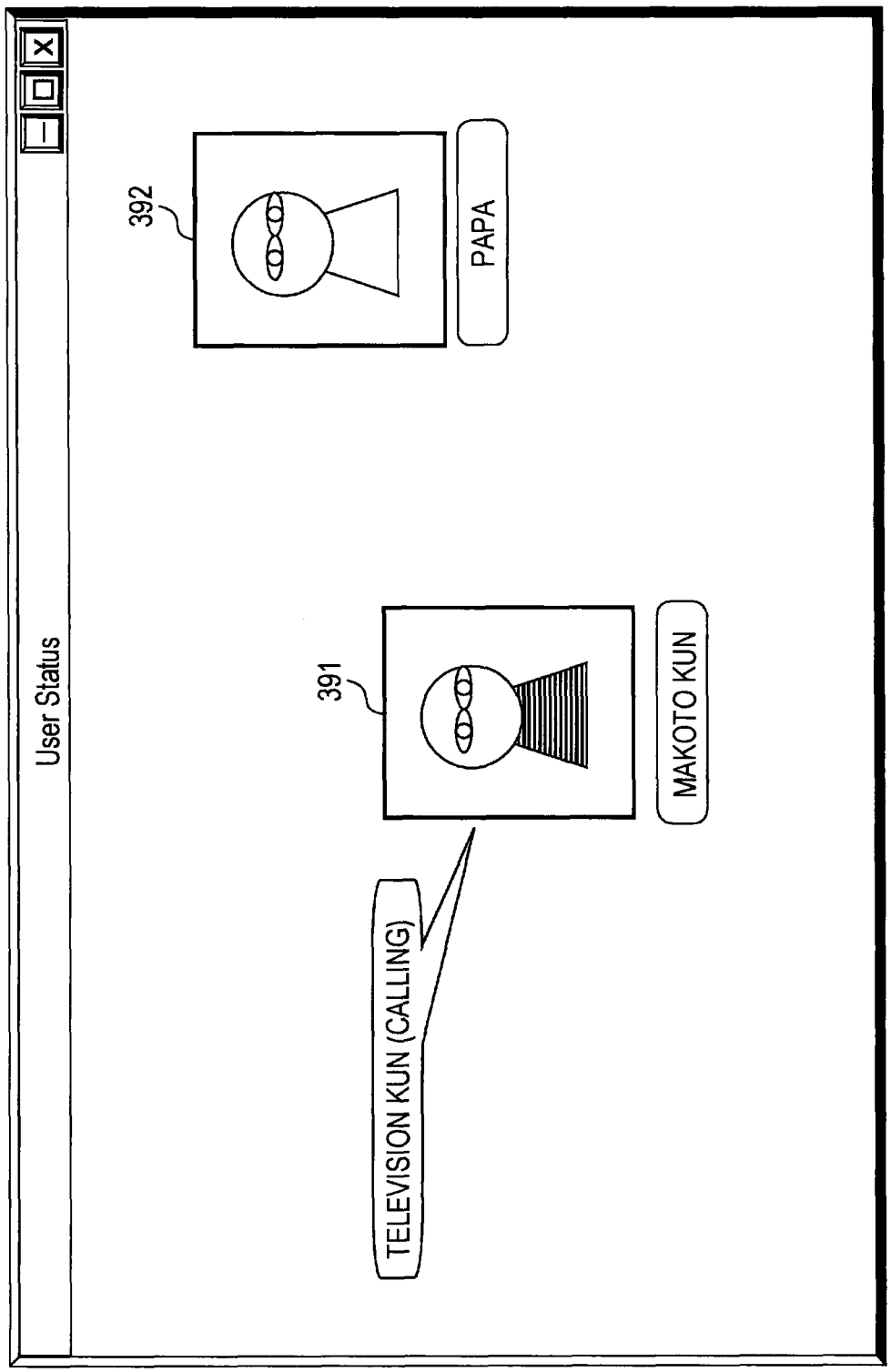
FIG. 11 is a diagram illustrating an example of a process performed by the information processing apparatus according to the invention.

More specifically, for example, the display of the identified user is performed as illustrated in FIG. 11. FIG. 11 is an example of display data in the display unit of the information processing apparatus 100. In the example illustrated in FIG. 11, two user images 391 and 392 are displayed as the image of the user recognized by the information processing apparatus 100.

With respect to the user images 391 and 392, the registered image of the user identified by the user identification process, that is, the registered image data which is stored in the storage unit of the information processing apparatus may be displayed, or the user image which is being photographed by the camera may be displayed.

In addition, recognition results for the speech from each user are displayed in the displayed screen for the identified user illustrated in FIG. 11. This display process is performed similarly to the display process for the user input information 302 (refer to FIG. 3) in [(3-1) Example of Feedback Process Using Avatar] described above with reference to FIGS. 3 to 6D.

In addition, with respect to which one of users speaks, the voice analysis process in the voice analysis unit 202, that is, a calling process for voice feature information in units of a user, which is stored in advance in the information processing apparatus 100 may be performed. In addition, the image analysis unit 204 may analyze a mouth movement from the image, and the analysis results may be used.

In the example illustrated in FIG. 11, "Makoto Kun" illustrated in the user image 391 is making a speech. "Makoto Kun" is calling the avatar corresponding to the information processing apparatus 100. A nickname may be designated to the avatar, and the designated nickname is registered in the information processing apparatus. The example illustrated in FIG. 11 is an example of the case where a nickname "Television Kun" is designated to the avatar corresponding to the information processing apparatus 100.

Figure 12:
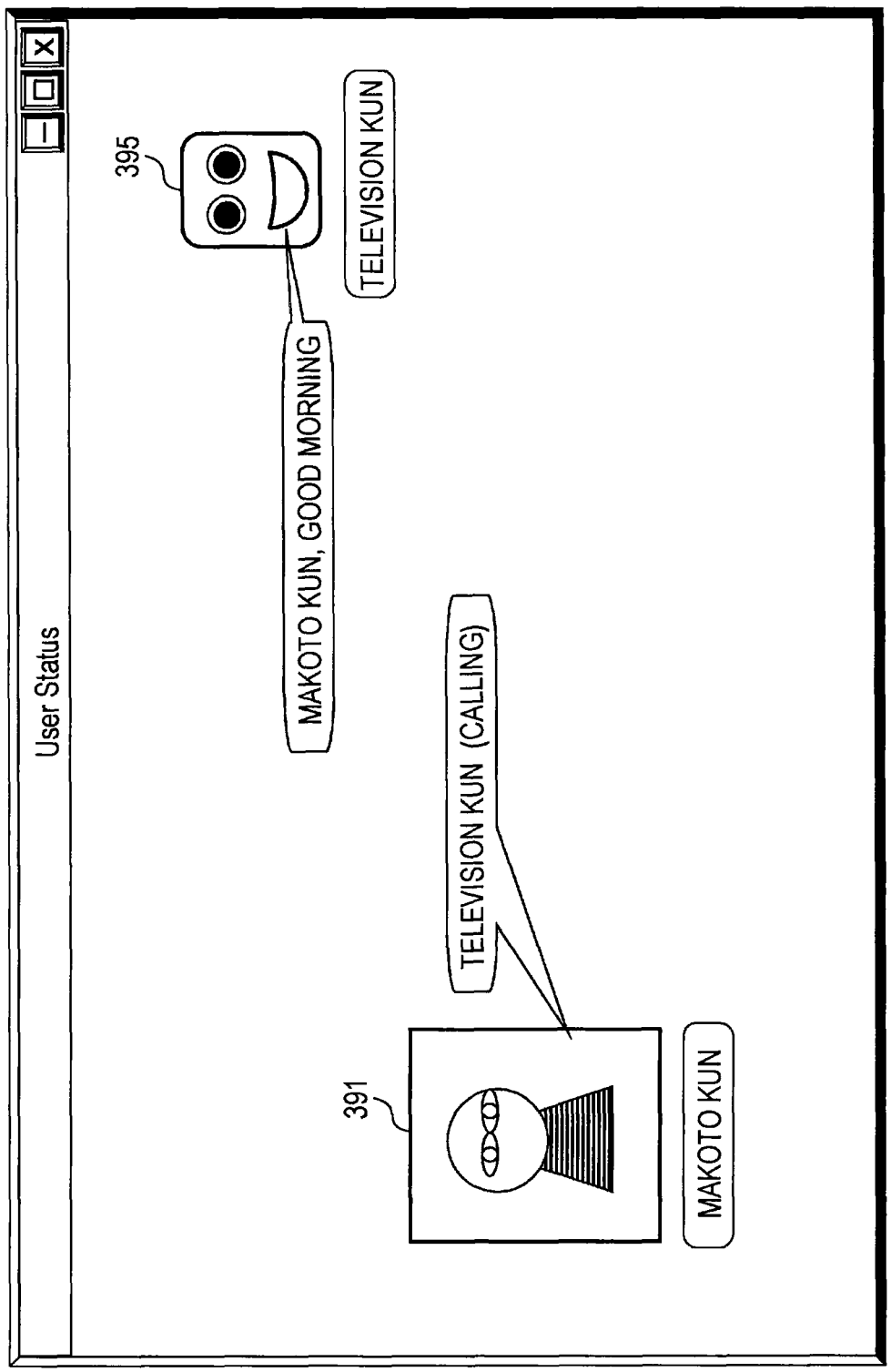
FIG. 12 is a diagram illustrating an example of a process performed by the information processing apparatus according to the invention.

If the voice analysis unit 202 of the information processing apparatus 100 detects the nickname calling, the data processing unit 205 displays, for example, the display data illustrated in FIG. 12.

FIG. 12 illustrates that the avatar 395 answers to the calling of the user (Makoto Kun), which is an example where the avatar (Television Kun) says to the user (Makoto Kun) the speech of greetings "Hi, Makoto Kun". In addition, the speech may be output through the voice output unit (speaker) 206 of the information processing apparatus 100.

By viewing the screens illustrated in FIGS. 11 and 12, the user checks whether or not the information processing apparatus 100 correctly recognize himself or herself and whether or not his or her speech is correctly understood.

The screens illustrated in FIGS. 11 and 12 are, for example, the initial screens displayed at the time of starting the information processing apparatus.

After the initial screens illustrated in FIGS. 11 and 12 are output, the user input various requests to the information processing apparatus by speech or gesture.

(3-5) User Classification Process

A detailed example of screen change displayed in the display unit of the information processing apparatus 100 according to the invention are described with reference to FIG. 13.

Figure 13:
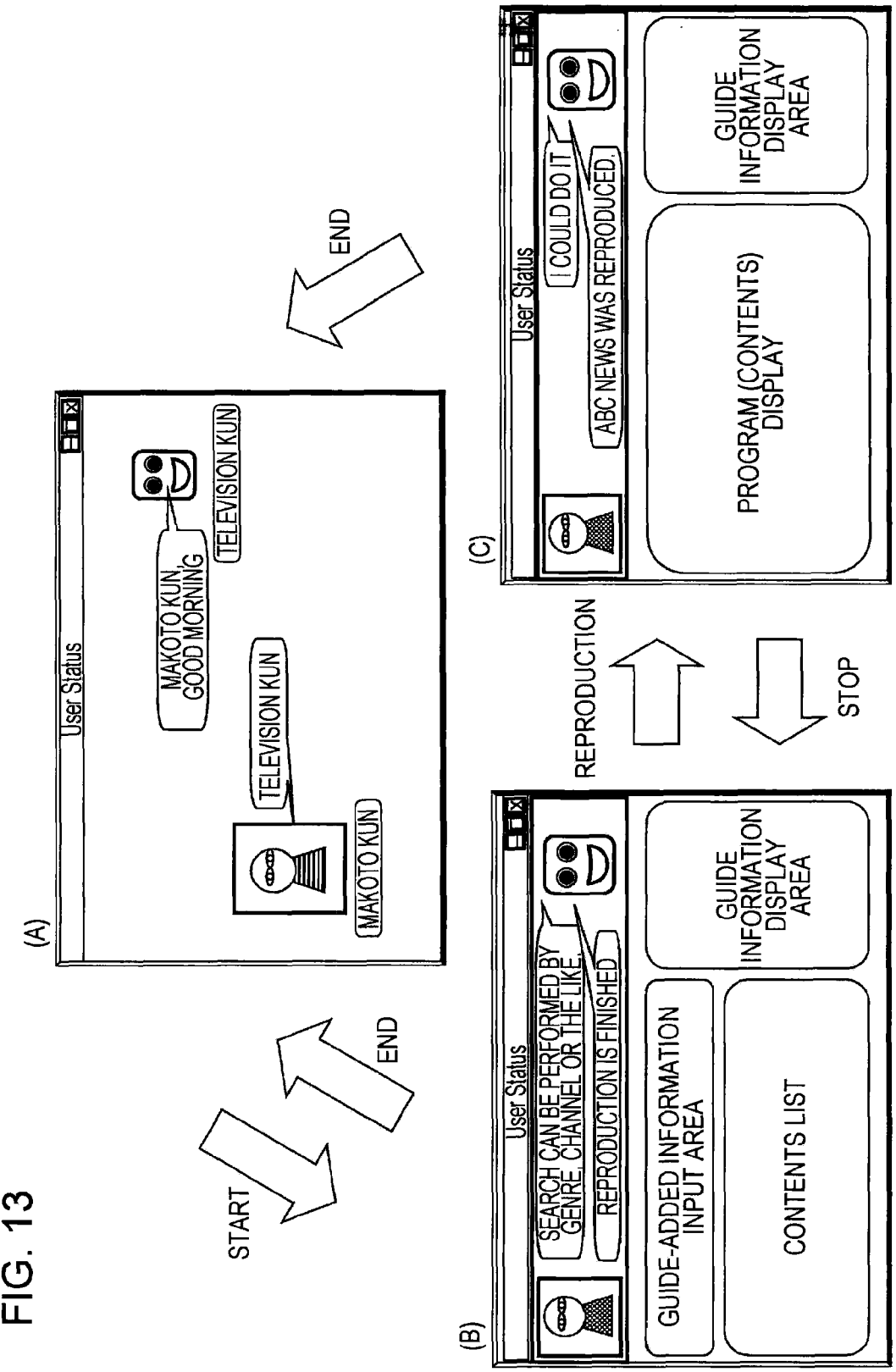
FIG. 13 is a diagram illustrating an example of a process performed by the information processing apparatus according to the invention.

FIG. 13 illustrates an example of three screens of an initial screen (A), an input screen (B), and a reproduction screen (C).

The initial screen (A) is a screen displayed by the described process [(3-4) User Classification Process] with reference to FIGS. 11 and 12.

The initial screen is generated by the data processing unit 205 using the analysis information of the user image in the image analysis unit 204 of the information processing apparatus 100 and the analysis information of the user speech in the voice analysis unit 202.

By viewing the screen, the user can check whether or not the user is corrected recognized by the apparatus and whether or not the user's request is correctly transferred to the apparatus.

The input screen (B) corresponds to the screen described with reference to FIG. 10.

The input screen is configured with areas: a feedback information display area where the conversation with the avatar can be set; a guide information display section-attached information input area where the guidance (guide information display section) information is displayed in units of data input section; a guide information display section information display area where independent guidance (guide information display section) information is displayed; and a content list display area.

The example of display is an example of data displayed in the display unit in the case of performing a process for selecting the reproducing content from the content displayed in the content list display area.

The feedback information display area where the conversation with the avatar can be set is the display area of the feedback information corresponding to [(3-1) Example of Feedback Using Avatar] described above with reference to FIGS. 3 to 6D.

The guide information display section-attached information input area where the guidance (guide information display section) information is described in units of data input section is the display area of the guidance (guide information display section) information corresponding to [(3-2) Example of Process Performing Guidance (Guide Information Display Section) on Inputtable Information of User] described above with reference to FIGS. 7 and 8.

The guide information display section information display area where the independent guidance (guide information display section) information is displayed is the display area of the guidance (guide information display section) information corresponding to [(3-2) Example of Process Performing Guidance (Guide Information Display Section) on Inputtable Information of User] described above with reference to FIG. 9.

By simultaneously displaying the above information, the user performs the instruction to the information processing apparatus through the speech or the gesture without confusion.

The reproduction screen (C) is an example of a screen where a program (contents) selected by the user is reproduced by using the input screen (B). In the case where the content reproduction is displayed, a display pattern of displaying the reproducing contents in the full screen and a pattern of displaying the reproducing contents, a feedback information display area where setting of conversation with the avatar can be performed, and a guide information display section information display area where independent guidance (guide information display section) information is displayed, as illustrated in the figure, can be switched.

Even in this state, the user can talk with the avatar and, for example, perform request for changing the reproducing contents, or the like at any time if necessary.

[4. Example of Process for Understanding of Necessity of User Input or Input Timing by Feedback to User]

Next, an example of a process for making a user to understand necessity of a user input or an input timing by performing a feedback process to the user is described.

In the aforementioned embodiment, the example of the process of accurately performing the input of the user by the conversation between the user and the apparatus using the avatar or the guide information display section display in the various data input areas are described.

However, even in the configuration, the user input with no error can not be guaranteed 100%. Necessarily, some input error may occur, and there may be a case where a process of the information processing apparatus, which is not coincident with the user's intention, is started.

More specifically, in the case where an error occurs in the voice analysis, there may occur a case where the information processing apparatus will not start a process with respect to the user speech.

In addition, a plurality of the users exists in front of the information processing apparatus, there may occur a case where the process starts with respect to a speech of a user irrelevant to the user who talks to the information processing apparatus.

In addition, there may be a case where the user's request is not the process which can be performed by the information processing apparatus.

In this manner, there are many factors of error occurrence in the communication between the user and the information processing apparatus. The hereinafter described process is an example of a process of performing feedback to the user as an optimized response at the time of the trouble occurrence.

More specifically, in the case where a factor of inhibiting process continuation occurs in a process based on the user speech or the user action (gesture), the data processing unit 205 of the information processing apparatus illustrated in FIG. 2 performs a process of generating and outputting feedback information corresponding to the process stage where the factor of inhibiting occurs.

(4-1) Example of Feedback Process on User Speech

For example, the system according to the invention analyzes the user speech through the voice recognition and determines the process of the information processing apparatus based on the analysis result.

With respect to the processes up to the process determination according to the voice recognition, it is necessary to consecutively perform a plurality of different processes. In other words, it is necessary to sequentially perform a plurality of the process stages as a pipeline process.

If the plurality of the process stages is smoothly performed, in the final process, for example, the response to the user is output. More specifically, the output of the avatar is displayed as an image or output as a voice.

However, in any one of process stages of the pipeline process, if a process error occurs, the final process, that is, the response of the avatar is not performed no matter how much time passes.

In this case, the user is in the standby state and may not understand the state of the information processing apparatus.

In hereinafter described example of process, the user can check the state of the apparatus (system) by sequentially performing feedback of the status or the like of the error occurring in each of a plurality of the process stages performed by the information processing apparatus to the user.

An example of the process of the information processing apparatus with respect to the user speech is described with reference to FIG. 14.

Figure 14:
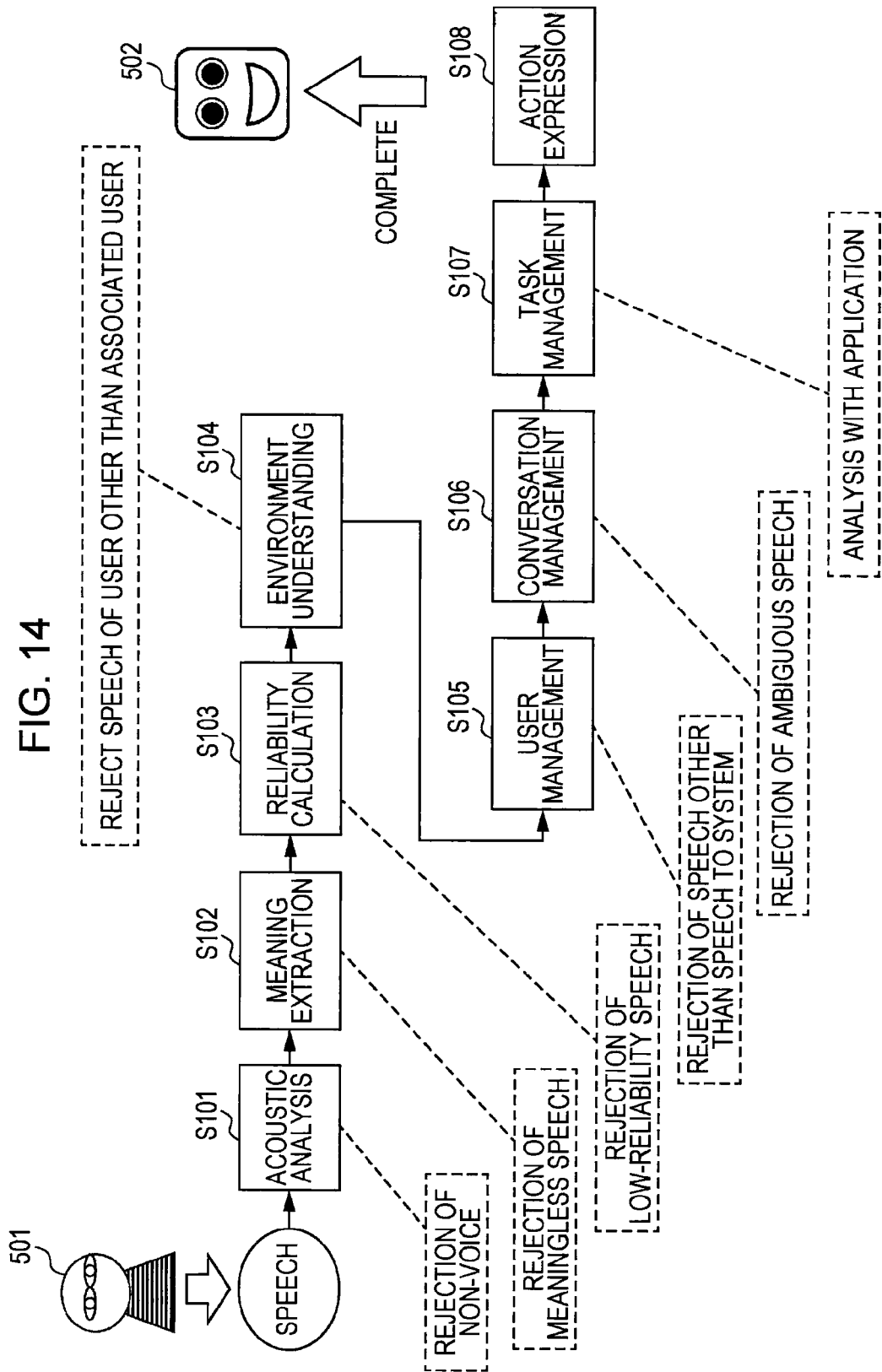
FIG. 14 is a diagram illustrating an example of a process performed by the information processing apparatus according to the invention in correspondence with the user speech.

FIG. 14 is a diagram illustrating an order of performance of process stages included in a process performed by the information processing apparatus in the case where a user 501 makes a speech.

The above process is an example of a process, where if all processes proceed, as a final process, the avatar 502 makes a speech to the user.

As illustrated in FIG. 14, the information processing apparatus to which the user speech is input performs the acoustic analysis in Step S101. This process is a process of the voice analysis unit 202 illustrated in FIG. 2. In the acoustic analysis process, a process of rejecting sound other than voice and acquiring only the human voice is performed. With respect to sound data which is determined not to be voice and rejected, the processes of the next stages are not performed. However, there is a case where the rejected data is actually speech data of a user. In this case, a troubled situation where a process according user's intention is not performed occurs.

In Step S102, a meaning extraction process is performed based on the acquired voice information. The process is also a process of the voice analysis unit 202 illustrated in FIG. 2. The process is performed, for example, on the basis of the matching process for the dictionary data latched in the voice analysis unit 202. In the process, in the case or the like where there are no matched registered words, the data are rejected as a meaningless speech. With respect to the rejected sound data, the processes of the next stages are not performed. However, there is a case where the rejected data is actually speech data of a user. In this case, a troubled situation where a process according user's intention is not performed occurs.

Next, in Step S103, a reliability of the voice recognition is calculated. The process is also a process of the voice analysis unit 202. The calculation of the reliability is performed based on, for example, a matching ratio with respect to the dictionary data latched in the voice analysis unit 202. The speech of which the reliability is determined to be low in comparison with a threshold value which is set in advance is rejected. With respect to the rejected sound data, the processes of the next stages are not performed. However, there is a case where the rejected data is actually speech data of a user. In this case, a troubled situation where a process according user's intention is not performed occurs.

In Step S104, an environment understanding process is performed. The process is performed as processes of the voice analysis unit 202 and the data processing unit 205. In the case where a plurality of the users exists in front of the information processing apparatus, there may be a case where a user other than the target user who performs a request to the information processing apparatus also makes a speech irrelevant to the apparatus. It is also necessary to reject this speech. However, there may be a case where the rejected speech is a speech with respect to the information processing apparatus. In this case, a process error, that is, a troubled situation where a process according to user's intention is not performed occurs.

In Step S105, a user management process is performed. The process is performed as a process of the data processing unit 205. The target user who performs a request to the information processing apparatus may not necessarily make a speech to the information processing apparatus. For example, there is a case where the target user may make a speech to another user. A process of identifying and rejecting the speech is performed. However, there is a case where the rejected speech is a speech which is made to the information processing apparatus. In this case, a process error, that is, a troubled situation where a process according to user's intention is not performed occurs.

In Step S106, the conversation management process is performed. The process is performed as a process of the data processing unit 205. An ambiguous speech included in the speech of the user who performs a request to the information processing apparatus is not processed but rejected. However, there is a case where the rejected speech is a speech including the request which the user performs to the information processing apparatus. In this case, a process error, that is, a troubled situation where a process according to user's intention is not performed occurs.

In Step S107, a task management process is performed. The process is performed as a process of the data processing unit 205. An application of performing a process based on the user speech is a process of starting the process based on the user speech. However, there is a case where the application may not perform the user's request. For example, this case is a case where there is another process which is being performed, a case where the request exceeds the capability of the application, or the like. In this case, a process error, that is, a troubled situation where a process according to user's intention is not performed occurs.

If the processes of Steps S101 to S107 are performed, finally, an action expression process of Step S108 is performed. The process is performed as a process of the data processing unit 205. For example, This process is a process where the avatar outputs a response to the user.

As described with reference to FIG. 14, a process which is performed by the information processing apparatus based on the user speech is performed as a process constructed by pipelining a plurality of different processes, so that an error may occur in each of the process stages. If the error occurs, the user response by the avatar is not performed. As a result, since the avatar does not give any response to the user who makes some requests or questions to the information processing apparatus, it may not be understood whether the information processing apparatus does not listen to the user's request or whether it is good to stand by during the performance of the process.

In order to prevent this troubled situation, the information processing apparatus according to the invention performs the avatar change according to a process status of the information processing apparatus in each of the process stages. Otherwise, the response of the avatar is performed.

The example is described with reference to FIG. 15.

The process details (1) to (7) illustrated in FIG. 15 correspond to the processes of Steps S101 to S107 illustrated in FIG. 14.

(1) acoustic analysis (S101)
(2) meaning extraction (S102)
(3) reliability calculation (S103)
(4) environment understanding (S104)
(5) user management (S105)
(6) conversation management (S106)
(7) task management (S107)

As described above with reference to FIG. 14, there is a case where the data rejection occurs in each of the processes of Steps S101 to S107. In the case where the data rejection is performed, the processes of the next process stages are not performed.

In this case, in the information processing apparatus according to the invention, the avatar is changed. In addition, for the description, with respect to the appearance of the avatar, as illustrated in the right end portion of FIG. 15, different avatars are distinguished by symbols the avatars (a), (b), (c), . . . .

For example, in the process of the acoustic analysis (S101) in (1) of FIG. 15, with respect to "I'm performing the process", the avatar is displayed (avatar (a)) in the state where its ears are emphasized in display and its head is shaken as illustrated in the uppermost portion of (1) of FIG. 15 in the example of the avatar. Due to the display, the user can check that the information processing apparatus securely listens to the user speech.

On the other hand, for example, in the case where the information processing apparatus determines that it is not the user speech, the process result becomes the non-voice rejection process (Failure). In this case, as illustrated in the figure, the avatar is changed from the state (a) where its ears are emphasized and its head is shaken into the avatar (b) where it is absent-minded to express that it does not listen to that. After that, the display returns to the original avatar (a) again. Due to the display, the user can check that the information processing apparatus does not listen to the user speech.

In the process of the meaning extraction (S102) in (2) of FIG. 15, for example, in the case where the matching process for the dictionary data latched in the voice analysis unit 202 fails and the meaning extraction is not performed, the avatar is changed from the state (a) where its ears are emphasized and its head is shaken into the avatar (b) where it is absent-minded to express that a process error (the meaning extraction is not performed) occurs. After that, the display returns to the original avatar (a) again. Due to the display, the user can check that the information processing apparatus does not listen to the user speech.

In the process the reliability calculation (S103) in (3) of FIG. 15, for example, even in the case where a predetermined matching ratio is not obtained in the matching process for the dictionary data latched in the voice analysis unit 202, the avatar is changed from the state (a) where its ears are emphasized and its head is shaken into the avatar (b) where it is absent-minded to express that a process error (the meaning extraction is not performed with high reliability) occurs. After that, the display returns to the original avatar (a) again. Due to the display, the user can check that the information processing apparatus does not listen to the user speech.

In the process of the environment understanding (S104) in (4) of FIG. 15, for example, in the case where the voice analysis unit 202 or the data processing unit 205 rejects the user speech which is to be originally processed, as illustrated in the figure, the avatar is changed from the state (a) where its ears are emphasized and its head is shaken into the avatar (c) where it is embarrassed to express that a process error (the process on the user speech is not performed) occurs. After that, the display returns to the original avatar (a) again. Due to the display, the user can check that the information processing apparatus is in the state where it dose not perform the process based on the user speech.

In the process of the user management (S105) in (5) of FIG. 15, for example, in the case where the data processing unit 205 rejects the user speech which is to be originally processed, as illustrated in the figure, the avatar is changed from the state (a) where its ears are emphasized and its head is shaken into the avatar (c) where it is embarrassed to express that a process error (the process on user speech is not performed) occurs. After that, the display returns to the original avatar (a) again. Due to the display, the user can check that the information processing apparatus is in the state where it dose not perform the process based on the user speech.

In the process of the conversation management (S106) in (6) of FIG. 15, for example, in the case where the data processing unit 205 determines the user speech to be ambiguous and rejects the user speech, as illustrated in the figure, the avatar is changed from the state (a) where its ears are emphasized and its head is shaken into the avatar (c) where it is embarrassed to express that a process error (the process on user speech is not performed) Occurs. After that, the display returns to the original avatar (a) again. Due to the display, the user can check that the information processing apparatus is in the state where it does not perform the process based on the user speech.

On the other hand, in the process of the conversation management (S106) in (6) of FIG. 15, for example, in the case where the data processing unit 205 can understand the user speech, as illustrated in the example of the avatar in the lower portion of (6), the avatar is changed from the state (a) where its ears are emphasized and its head is shaken into the avatar (d) where it laughs with its mouth opened widely to express that it succeeds in the process (understands the user speech). After that, the display returns to the original avatar (a) again. Due to the display, the user can check that the information processing apparatus understands the user speech.

In the process of the task management (S107) in (7) of FIG. 15, for example, in the case where the data processing unit 205 determines to understand the user speech and to be able to perform the application, the avatar is changed from the avatar (d) where it laughs with its mouth opened widely into the avatar (e) where it laughs with its mouth opened to express that it succeeds in the process (the process according to the user speech is started). After that, the display returns to the original avatar (a) again. Due to the display, the user can check that the process based on the user speech is started in the information processing apparatus.

In this manner, in the information processing apparatus according to the invention, the avatar is configured to be changed according to the status (success, failure, or the like) of the process in various process stages performed by the information processing apparatus to present and notify the apparatus state to the user. Due to the process, the user can check the apparatus state somewhat. For example, in the case where the avatar has an embarrassed facial expression, the user can performs a process of speaking the request again, so that a useless process of merely being in standby can be omitted.

In addition, in the process described with reference to FIG. 15, the example where only the facial expression of the avatar is changed is described. However, as the speech of the avatar, a document display process or a voice output process with respect to specific process information may be configured to be performed. In other words, a process may be configured to be performed so that the avatar as a status indicator of the information processing apparatus is displayed in the display unit and information describing the status of the information processing apparatus is output through the displayed avatar. For example, a process of outputting description of a failed process, details of a successful process, or the like is performed.

(4-2) Example of Feedback Process for User Action (Gesture)

The processes described with reference to FIGS. 14 and 15 are process stages in the voice analysis with respect to the user speech and an example of the feedback process in each of the process stages. Next, process stages in the image analysis with respect to the user action (gesture) and an example of the feedback process in each of the process stages are described with reference to FIGS. 16 and 17.

An example of a process of the information processing apparatus with respect to the user action (gesture) is described with reference to FIG. 16.

Figure 16:
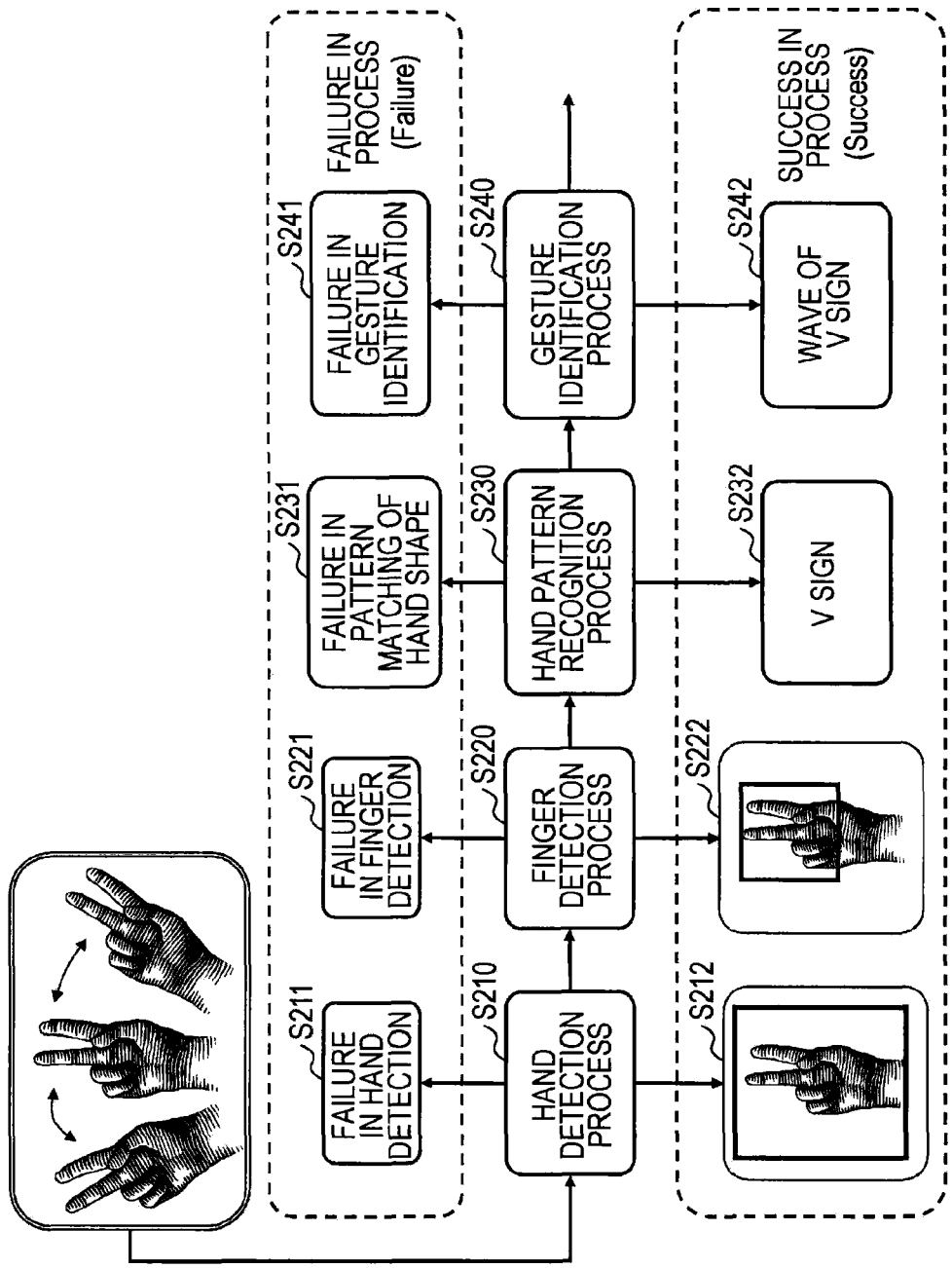
FIG. 16 is a diagram illustrating an example of a process performed by the information processing apparatus according to the invention in correspondence with the user action (gesture).

FIG. 16 is a diagram illustrating a performance order (Steps S210→S220→S230→S240) of the process stages included in the process performed by the information processing apparatus in the case where the user performs some action (gesture) using his or her fingers.

If all processes proceed, as a final process, for example, the avatar makes some speech to the user. Otherwise, the instructed process (for example, the content reproduction, or the like) is performed.

As illustrated in FIG. 16, the information processing apparatus input with the user action (gesture) performs a hand detection process in Step S210. This process is a process which the image analysis unit 204 illustrated in FIG. 2 performs based on the image input from the image input unit (camera) 203. There are two cases, that is, a case where the hand detection process fails and a case where the hand detection process succeeds. In the case where the hand detection process fails, the procedure proceeds to Step S211, where the process such as the avatar change is performed in the data processing unit 205. This process is described later. In the case where the hand detection process succeeds, for example, hand detection information is acquired as illustrated in Step S212, and the procedure proceeds to a finger detection process of the next Step S220.

In Step S220, a finger detection process is performed. This process is a process in which the image analysis unit 204 illustrated in FIG. 2 performs based on the image input from the image input unit (camera) 203. There are also two cases, that is, a case where the finger detection process fails and a case where the finger detection process succeeds. In the case where the finger detection process fails, the procedure proceeds to Step S221, where the process such as the avatar change is performed in the data processing unit 205. This process is described later. In the case where the finger detection process succeeds, for example, finger detection information illustrated in Step S222 is acquired, and the procedure proceeds to a hand pattern recognition process of the next Step S230.

In Step S230, the hand pattern recognition process is performed. This process is a process which is performed in the image analysis unit 204 or the data processing unit 205 illustrated in FIG. 2. There are also two cases, that is, a case where the hand pattern detection process fails and a case where the hand pattern detection process succeeds. There are two cases, that is, a case where the hand pattern detection process fails and a case where the hand pattern detection process succeeds. In the case where the hand pattern detection process fails, the procedure proceeds to Step S231, where the process such as the avatar change is performed in the data processing unit 205. This process is described later. In the case where the hand pattern detection process succeeds, for example, detection information indicating, for example, a "V sign" illustrated in Step S232 is acquired, and the procedure proceeds to a gesture identification process of the next Step S240.

In Step S240, the gesture identification process is performed. This process is a process which is performed in the image analysis unit 204 or the data processing unit 205 illustrated in FIG. 2. There are also two cases, that is, a case where the gesture identification process fails and a case where the gesture identification process succeeds. In the case where the gesture identification process fails, the procedure proceeds to Step S241, where the process such as the avatar change is performed in the data processing unit 205. This process is described later. In the case where the gesture identification process succeeds, for example, detection information indicating, for example, a "V sign wave" illustrated in Step S242 is acquired, and the procedure proceeds to the next Step.

As described with reference to FIG. 16, a process which is performed by the information processing apparatus based on the user action (gesture) is performed as a process constructed by pipelining a plurality of different processes, so that an error may occur in each of the process stages. If the error occurs, a response or a process of the information processing apparatus with respect to the user's request is not performed. As a result, since the avatar does not gives any response to the user who makes some requests or questions to the information processing apparatus and the information processing apparatus does not also start any new process, it is not understood whether the information processing apparatus does not listen to the user's request or whether it is good to stand by during the performance of the process.

In order to prevent this troubled situation, the information processing apparatus according to the invention performs the avatar change according to a process status of the information processing apparatus in each of the process stages. Otherwise, the response of the avatar is performed.

The example is described with reference to FIG. 17.

The process details (1) to (4) illustrated in FIG. 17 correspond to the processes of Steps S210 to 240 illustrated in FIG. 16. (5) illustrates a task management process as the final process. The processes illustrated in FIG. 17 are the following processes (1) to (5).

(1) hand detection process (S210)
(2) finger detection process (S220)
(3) hand pattern recognition process (S230)
(4) action (gesture) identification process (S240)
(5) task management As described above with reference to FIG. 16, in the process of Steps S210 to S240, an error may occur. In the case where an error occurs, the processes of the next process stages are not performed. In this case, in the information processing apparatus according to the invention, the avatar is changed. In addition, for the description, with respect to the appearance of the avatar, as illustrated in the right end portion of FIG. 17, different avatars are distinguished and described by the avatars (a), (b), (c), . . . , as symbols.

For example, in the hand detection process (S210) from the image in (1) of FIG. 17, "I'm performing the process" is displayed by the avatar (avatar (a)) in the state where its head is shaken so as to express that it is watching as illustrated in the upper portion of (1) of FIG. 17 in the example of the avatar. Due to the display, the user can check that the information processing apparatus is securely watching the user action (gesture).

On the other hand, for example, in the case where the information processing apparatus fails in the hand detection process (S210), the avatar is changed from the state (a) where its head is shaken into the avatar (b) where it is absent-minded to express that a process error (failure in the hand detection) occurs as illustrated in the lower portion of (1) of FIG. 17. After that, the display returns to the original avatar (a) again. Due to the display, the user can understand that the information processing apparatus does not securely check the user action (gesture).

In the case where the finger detection fails in the finger detection process (S220) of (2) of FIG. 17, the avatar is changed from the state (a) where its head is shaken into the avatar (b) where it is absent-minded to express that a process error (failure in the finger detection) occurs as illustrated in the right end portion of (2) of FIG. 17. After that, the display returns to the original avatar (a) again. Due to the display, the user can understand that the information processing apparatus does not securely check the user action (gesture).

In the case where the hand shape pattern recognition fails in the hand shape pattern recognition process (S230) of (3) of FIG. 17, the avatar is changed from the state (a) where its head is shaken to the avatar (c) of an embarrassed facial expression to express that a process error (failure in the hand shape pattern recognition) occurs as illustrated in the right end portion of (3) of FIG. 17. After that, the display returns to the original avatar (a) again. Due to the display, the user can understand that the information processing apparatus does not securely check the user action (gesture).

In the case where the action (gesture) identification process fails in the action (gesture) identification process (S240) of (4) of FIG. 17, the avatar is changed from the state (a) where its head is shaken to the avatar (c) of an embarrassed facial expression to express that a process error (failure in the hand shape pattern recognition) occurs as illustrated in the right end portion of (4) of FIG. 17. After that, the display returns to the original avatar (a) again. Due to the display, the user can understand that the information processing apparatus does not securely check the user action (gesture).

On the other hand, in the case where the action (gesture) identification process succeeds in the action (gesture) identification process (S240) of (4) of FIG. 17, the avatar is changed from the state (a) where its head is shaken to the avatar (d) of a facial expression of the avatar laughing with its mouth opened widely to express that it succeeds in the process (understands the user speech) as illustrated in the example of the avatar in the lower portion of (4). After that, the display returns to the original avatar (a) again. Due to the display, the user can check that the information processing apparatus understands the user action (gesture).

In the case where, for example, the data processing unit 205 can understand the user action (gesture) so that it is determined that the application can be executed in the task management process of (5) of FIG. 17, the avatar is changed from the avatar (d) of a facial expression of the avatar laughing with its mouth opened widely into the avatar (e) of a facial expression of the avatar laughing with its mouth opened to express that it succeeds in the process (a process according to the user action (gesture) starts). After that, the display returns to the original avatar (a) again. Due to the display, the user can check that a process based on the user action (gesture) starts in the information processing apparatus.

In this manner, in the information processing apparatus according to the invention, the avatar is configured to be changed according to the status (success, failure, or the like) of the process in various process stages performed by the information processing apparatus to present and notify the apparatus state to the user. Due to the process, the user can check the apparatus state somewhat. For example, in the case where the avatar has an embarrassed facial expression, the user can performs a process of speaking the request again, so that a useless process of merely being in standby can be omitted.

In addition, in the process described with reference to FIG. 17, the example where only the facial expression of the avatar is changed is described. However, as the speech of the avatar, a document display process or a voice output process with respect to specific process information may be configured to be performed. In other words, a process may be configured to be performed so that the avatar as a status indicator of the information processing apparatus is displayed in the display unit and information describing the status of the information processing apparatus is output through the displayed avatar. For example, a process of outputting description of a failed process, details of a successful process, or the like is performed.

[5. Example of Hardware Configuration of Information Processing Apparatus]

Figure 18:
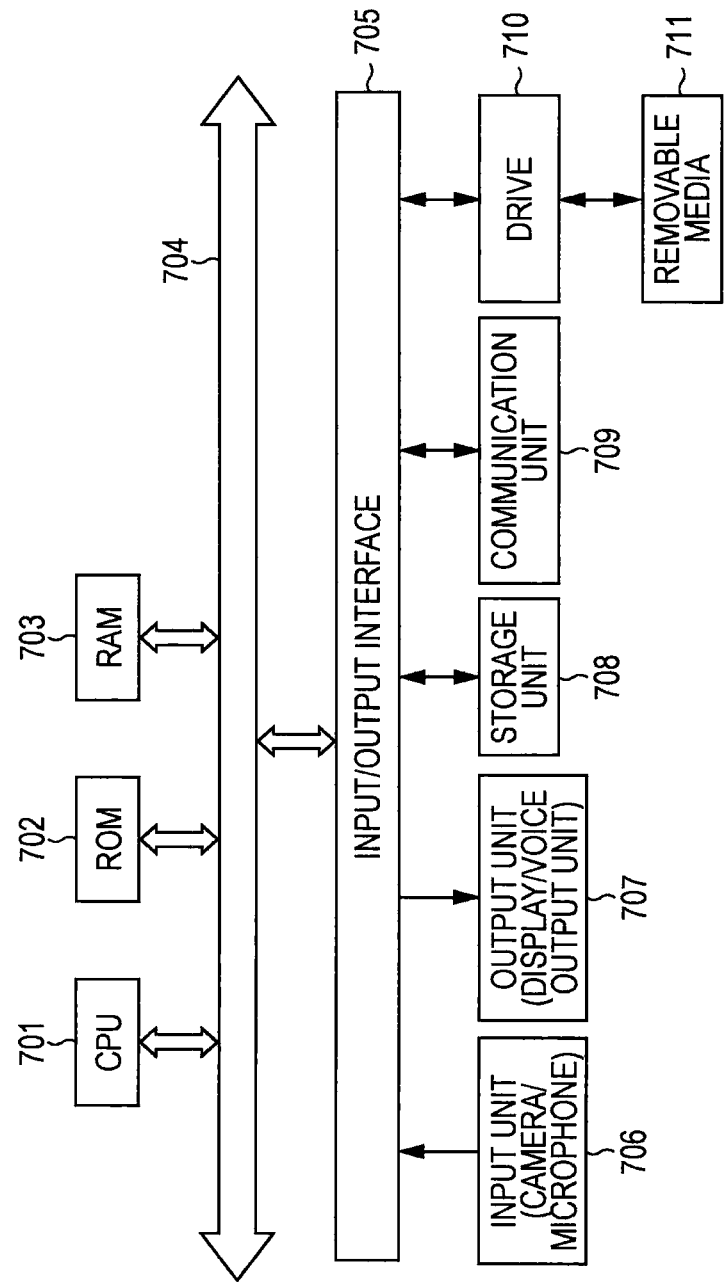
FIG. 18 is a diagram illustrating an example of hardware configuration of the information processing apparatus according to the invention.

Finally, an example of hardware configuration of information processing apparatus performing the aforementioned processes is described with reference to FIG. 18. The CPU (Central Processing Unit) 701 performs various processes according to a program stored in the ROM (Read Only Memory) 702, or the storage unit 708.

For example, the CPU performs the processes of the voice analysis unit 202, the image analysis unit 204, and the data processing unit 205 in the configuration of the information processing apparatus of FIG. 2. The RAM (Random Access Memory) 703 appropriately stores programs, data, and the like performed by the CPU 701. The CPU 701, the ROM 702, and the RAM 703 are connected to each other via a bus 704.

The CPU 701 is connected via the bus 704 to an input/output interface 705. An input unit 706 such as a camera, a microphone, a remote controller, a keyboard, or a mouse and an output unit 707 constructed with a display, a speaker, or the like are connected to the input/output interface 705. The CPU 701 performs various processes corresponding to information input from the input unit 706 and outputs the processing result to, for example, the output unit 707.

The storage unit 708 connected to the input/output interface 705 is constructed with, for example, a hard disk to store the programs performed by the CPU 701 or various data.

In addition, various types of the voice information or the dictionary data which are necessarily used for the voice recognition process, the user image data which are necessarily used for the user recognition process, and the like are recorded therein. The communication unit 709 communicates with external apparatuses through a network such as the Internet or a local area network.

The drive 710 connected to the input/output interface 705 drives a magnetic disk, an optical disk, an magneto-optical disk, a removable media 711 such as a semiconductor memory, or the like to acquire the recorded programs, data, or the like. The acquired programs or data are transmitted and stored in the storage unit 708 if necessary.

Hereinbefore, the invention is described in detail with reference to specific embodiments. However, it is obvious that modifications and alterations of the embodiments can be made by the ordinarily skilled in the related art without departing from the spirit of the invention. In other words, the invention is disclosed through exemplary embodiments, and thus, the embodiments should not be analyzed in a limited meaning. In the determination of the spirit of the invention, the claims should be considered.

In addition, a series of the processes described in the specification can be implemented in a hardware configuration, a software configuration, or a combination thereof. In the case of performing the process in the software configuration, a program recording the process procedure may be installed in a memory in a computer assembled with dedicated hardware to be performed, or the program may be installed in a general-purpose computer which can perform various types of processes to be performed. For example, the program may be recorded in advance in a recording medium. In addition to the installation of the program from the recording medium to the computer, a program may be received via a network such as a LAN (Local Area Network) or the Internet and installed in a recording medium such as an embedded hard disk.

In addition, various types of the processes described in the specification may be performed in a time sequence according to the description and simultaneously or individually according to a processing capability of an apparatus performing the processes or if necessary. In addition, a term "system" in the specification denotes a logical set configuration of a plurality of apparatuses, but it is not limited to a system where the apparatus of each configuration is contained in the same casing.

The present application contains subject matter related to that disclosed in Japanese Priority Patent Application JP 2010-074158 filed in the Japan Patent Office on Mar. 29, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a voice analysis unit configured to perform an analysis process for a user speech, the user speech including an instruction for performing a desired operation; and
a data processing unit configured to receive analysis results of the voice analysis unit to determine a process which is to be performed by the information processing apparatus, the process corresponding to the instruction given by the user through the user speech,
wherein in a case where a factor of inhibiting process continuation occurs based on at least one of the voice analysis unit and the data processing unit determining that the instruction given by the user is not understood, the data processing unit performs a process of generating and outputting feedback information to the user, in which the factor of inhibiting process continuation occurs as a result of a failure to understand the instruction given by the user,
wherein the data processing unit is further configured to perform a process of displaying an avatar as a status indicator of the information processing apparatus as the outputted feedback information,
wherein the avatar visually depicts a status of the information processing apparatus, as a feedback notification to the user, by visually indicating that the user speech is being received or analyzed at a time when the user speech is being received or analyzed, by visually indicating that the instruction included in the user speech is not understood when the instruction included in the user speech is not understood, by visually indicating that the instruction included in the user speech is understood when the instruction included in the user speech is understood, by visually indicating that the process which is to be performed in correspondence with the instruction given by the user cannot successfully be determined when the data processing unit cannot successfully determine the process which is to be performed in correspondence with the instruction given by the user, and when the instruction for performing the desired operation has been understood, the information processing apparatus performs the process corresponding to the instruction and the avatar is changed to visually indicate that the desired operation is being performed, and
wherein at least one of the voice analysis unit and the data processing unit is implemented via a processor.

2. The information processing apparatus according to claim 1,
wherein the information processing apparatus further comprises an image analysis unit configured to analyze a user action, and
wherein the data processing unit is further configured to receive analysis results of the image analysis unit to determine the process which is to be performed by the information processing apparatus, the process corresponding to an instruction given by the user through the user action, and in a case where a second factor of inhibiting process continuation occurs based on at least one of the image analysis unit and the data processing unit determining that the instruction given by the user through the user action is not understood, the data processing unit performs a process of generating and outputting feedback information to the user, in which the second factor of inhibiting process continuation occurs as a result of a failure to understand the instruction given by the user,
wherein at least one of the voice analysis unit, the data processing unit, and the image analysis unit is implemented via a processor.

3. The information processing apparatus according to claim 1, wherein the data processing unit changes an appearance of the displayed avatar based on whether or not the instruction given by the user is understood.

4. The information processing apparatus according to claim 1, wherein the data processing unit changes a facial expression of the displayed avatar based on whether or not the instruction given by the user is understood.

5. The information processing apparatus according to claim 4, wherein the facial expression of the displayed avatar indicates a current mood based on whether or not the instruction given by the user is understood.

6. The information processing apparatus according to claim 1,
wherein the avatar is a static image that conveys a visual notification as to whether or not the instruction given by the user is understood.

7. The information processing apparatus according to claim 1,
wherein the avatar depicts a facial expression that visually conveys a state of emotion corresponding to whether or not the instruction given by the user is understood.

8. The information processing apparatus according to claim 1,
wherein the avatar visually expresses a state of emotion, the state of emotion based upon whether or not the instruction given by the user is understood.

9. An information processing method of performing an information process in an information processing apparatus, comprising the steps of:
performing an analysis process for a user speech in an voice analysis unit, the user speech including an instruction for performing a desired operation; and
receiving analysis results of the performing of the analysis process to determine a process which is to be performed by the information processing apparatus, the process corresponding to the instruction given by the user through the user speech,
wherein when a factor of inhibiting process continuation occurs based on a determination that the instruction given by the user is not understood during at least one of the performing of the analysis process and the determining of the process which is to be performed by the information processing apparatus, a feedback information is generated and outputted to the user,
wherein the factor of inhibiting process continuation occurs as a result of a failure to understand the instruction given by the user,
wherein an avatar is displayed as a status indicator of the information processing apparatus as the outputted feedback information,
wherein the avatar visually depicts a status of the information processing apparatus, as a feedback notification to the user, by visually indicating that the user speech is being received or analyzed at a time when the user speech is being received or analyzed, by visually indicating that the instruction included in the user speech is not understood when the instruction included in the user speech is not understood, by visually indicating that the instruction included in the user speech is understood when the instruction included in the user speech is understood, by visually indicating that the process which is to be performed in correspondence with the instruction given by the user cannot successfully be determined when the process which is to be performed in correspondence with the instruction given by the user cannot successfully be determined, and when the instruction for performing the desired operation has been understood, the process corresponding to the instruction is performed and the avatar is changed to visually indicate that the desired operation is being performed, and
wherein the inputting is implemented via a processor.

10. The information processing method according to claim 9, wherein an appearance of the displayed avatar is changed based on whether or not the instruction given by the user is understood.

11. The information processing method according to claim 9, wherein a facial expression of the displayed avatar is changed based on whether or not the instruction given by the user is understood.

12. A non-transitory computer-readable medium having embodied thereon a program, which when executed by a processor in an information processing apparatus causes the information processing apparatus to execute a method, the method comprising:
allowing a voice analysis unit to perform an analysis process for a user speech, the user speech including an instruction for performing a desired operation; and
allowing a data processing unit to be inputted with analysis results of the performing of the analysis process for the user speech, and determining a process which is to be performed by the information processing apparatus, the process corresponding to the instruction given by the user through the user speech,
wherein when a factor of inhibiting process continuation occurs based on a determination that the instruction given by the user is not understood during at least one of the performing of the analysis process and the determining of the process which is to be performed by the information processing apparatus, a feedback information is generated and outputted to the user,
wherein the factor of inhibiting process continuation occurs as a result of a failure to understand the instruction given by the user,
wherein an avatar is displayed as a status indicator of the information processing apparatus as the outputted feedback information,
wherein the avatar visually depicts a status of the information processing apparatus, as a feedback notification to the user, by visually indicating that the user speech is being received or analyzed at a time when the user speech is being received or analyzed, by visually indicating that the instruction included in the user speech is not understood when the instruction included in the user speech is not understood, by visually indicating that the instruction included in the user speech is understood when the instruction included in the user speech is understood, by visually indicating that the process which is to be performed in correspondence with the instruction given by the user cannot successfully be determined when the process which is to be performed in correspondence with the instruction given by the user cannot successfully be determined, and when the instruction for performing the desired operation has been understood, the process corresponding to the instruction is performed and the avatar is changed to visually indicate that the desired operation is being performed.

13. The non-transitory computer-readable medium according to claim 12, wherein in the executed method, an appearance of the displayed avatar is changed based on whether or not the instruction given by the user is understood.

14. The non-transitory computer-readable medium according to claim 12, wherein in the executed method, a facial expression of the displayed avatar is changed based on whether or not the instruction given by the user is understood.

* * * * *